(12) United States Patent
Konze et al.

(10) Patent No.: US 8,202,953 B2
(45) Date of Patent: *Jun. 19, 2012

(54) HIGH EFFICIENCY SOLUTION POLYMERIZATION PROCESS

(75) Inventors: Wayde V. Konze, Midland, MI (US); James C. Stevens, Richmond, TX (US); Daniel D. VanderLende, Sugar Land, TX (US)

(73) Assignee: Dow Global Technologies LLC, Midland, MI (US)

( * ) Notice: Subject to any disclaimer, the term of this patent is extended or adjusted under 35 U.S.C. 154(b) by 369 days.

This patent is subject to a terminal disclaimer.

(21) Appl. No.: 12/300,859

(22) PCT Filed: Apr. 24, 2007

(86) PCT No.: PCT/US2007/009843
§ 371 (c)(1),
(2), (4) Date: Apr. 29, 2009

(87) PCT Pub. No.: WO2007/136495
PCT Pub. Date: Nov. 29, 2007

(65) Prior Publication Data
US 2010/0036069 A1 Feb. 11, 2010

Related U.S. Application Data

(60) Provisional application No. 60/801,182, filed on May 17, 2006.

(51) Int. Cl.
*C08F 4/64* (2006.01)
*C08F 4/52* (2006.01)
*C08F 4/76* (2006.01)

(52) U.S. Cl. ........ 526/161; 526/160; 526/172; 526/170; 526/905; 526/348; 526/352

(58) Field of Classification Search .................. 526/161, 526/172, 901
See application file for complete search history.

(56) References Cited

U.S. PATENT DOCUMENTS

| | | |
|---|---|---|
| 3,914,342 A | 10/1975 | Mitchell |
| 3,953,413 A | 4/1976 | Hwang et al. |
| 4,173,548 A | 11/1979 | Pullukat et al. |
| 4,330,646 A | 5/1982 | Sakurai et al. |
| 4,543,399 A | 9/1985 | Jenkins, III et al. |
| 4,564,660 A | 1/1986 | Williams et al. |
| 4,588,790 A | 5/1986 | Jenkins, III et al. |
| 4,612,300 A | 9/1986 | Coleman, III |
| 4,835,219 A | 5/1989 | Tajima et al. |
| 4,981,927 A | 1/1991 | Rekers et al. |
| 5,028,670 A | 7/1991 | Chinh et al. |
| 5,032,562 A | 7/1991 | Lo et al. |
| 5,064,802 A | 11/1991 | Stevens et al. |
| 5,106,804 A | 4/1992 | Bailly et al. |
| 5,153,157 A | 10/1992 | Hlatky et al. |
| 5,272,236 A | 12/1993 | Lai et al. |
| 5,278,272 A | 1/1994 | Lai et al. |
| 5,288,933 A * | 2/1994 | Kao et al. ........................ 585/513 |
| 5,321,106 A | 6/1994 | LaPointe |
| 5,350,723 A | 9/1994 | Neithamer et al. |
| 5,352,749 A | 10/1994 | DeChellis et al. |
| 5,380,810 A | 1/1995 | Lai et al. |
| 5,405,922 A | 4/1995 | DeChellis et al. |
| 5,425,872 A | 6/1995 | Devore et al. |
| 5,436,304 A | 7/1995 | Griffin et al. |
| 5,453,410 A | 9/1995 | Kolthammer et al. |
| 5,453,471 A | 9/1995 | Bernier et al. |
| 5,461,123 A | 10/1995 | Song et al. |
| 5,462,999 A | 10/1995 | Griffin et al. |
| 5,473,028 A | 12/1995 | Nowlin et al. |
| 5,541,270 A | 7/1996 | Chinh et al. |
| 5,556,238 A | 9/1996 | Chinh et al. |
| 5,608,019 A | 3/1997 | Cheruvu et al. |
| 5,612,271 A | 3/1997 | Zandona et al. |
| 5,616,661 A | 4/1997 | Eisinger et al. |
| 5,625,087 A | 4/1997 | Devore et al. |
| 5,648,310 A | 7/1997 | Wasserman et al. |
| 5,672,669 A | 9/1997 | Wasserman et al. |
| 5,719,095 A | 2/1998 | Brekner et al. |
| 5,721,185 A | 2/1998 | LaPointe et al. |
| 5,767,208 A | 6/1998 | Turner et al. |
| 5,783,512 A | 7/1998 | Jacobsen et al. |
| 5,798,427 A | 8/1998 | Foster et al. |
| 5,849,852 A | 12/1998 | Koch et al. |
| 5,869,575 A | 2/1999 | Kolthammer et al. |
| 5,869,723 A | 2/1999 | Hinokuma et al. |
| 5,883,204 A | 3/1999 | Spencer et al. |
| 5,919,983 A | 7/1999 | Rosen et al. |
| 5,977,251 A | 11/1999 | Kao et al. |
| 6,103,657 A | 8/2000 | Murray |
| 6,140,521 A | 10/2000 | Chen et al. |
| 6,160,146 A | 12/2000 | Chen et al. |
| 6,207,774 B1 | 3/2001 | Hasegawa et al. |
| 6,214,760 B1 | 4/2001 | Chen et al. |

(Continued)

FOREIGN PATENT DOCUMENTS

EP 89691 9/1983

(Continued)

OTHER PUBLICATIONS

Yano, Akihiro et al. (2000).Effect of Ligand Structures on High Temperature Homo- and Copolymerization . . . *J. of Mol. Cat. A: Chemical*. 156, 133-141.

Fineman, Morton, & Ross, Sidney D. (1950). Linear Method for Determining Monomer Reactivity Ratios in Copolymerization. *J. of Poly. Science*. 5(2), 259-265.

Lambert , Joseph B. et al. (1994).Silyl Cations in the Solid and in Solution. *Organometallics*. 13(6), 2430-2443.

Lambert, Joseph B. et al. (1993).Tetrakis(pentafluorophenyl)borate: a new Anion for Silylium Cations in the Condensed Phase. *J. Chem. Soc., Chem. Commun.*. 383-384.

(Continued)

Primary Examiner — Rip A. Lee

(57) ABSTRACT

A catalyst composition comprising a zirconium complex of a polyvalent aryloxyether and an alumoxane, polymerization processes employing the same, especially the continuous, solution polymerization of ethylene and one or more $C_{3-30}$ olefins or diolefins to prepare copolymers having reduced cocatalyst by-product content, are disclosed.

22 Claims, No Drawings

U.S. PATENT DOCUMENTS

| | | |
|---|---|---|
| 6,291,609 B1 | 9/2001 | Crowther et al. |
| 6,313,240 B1 | 11/2001 | Hasegawa et al. |
| 6,319,989 B1 | 11/2001 | Anderson et al. |
| 6,320,005 B1 | 11/2001 | Murray |
| 6,395,671 B2 | 5/2002 | LaPointe |
| 6,683,149 B2 | 1/2004 | Jain et al. |
| 6,686,490 B1 | 2/2004 | Kol et al. |
| 6,696,379 B1 | 2/2004 | Carnahan et al. |
| 6,897,276 B2 * | 5/2005 | Boussie et al. ............ 526/172 |
| 2003/0229188 A1 | 12/2003 | Nagy et al. |
| 2004/0010103 A1 | 1/2004 | Boussie et al. |
| 2005/0164872 A1 | 7/2005 | Boussie et al. |
| 2005/0215737 A1 | 9/2005 | Dharmarajan et al. |
| 2009/0299116 A1 * | 12/2009 | Konze et al. ............ 585/507 |

FOREIGN PATENT DOCUMENTS

| | | |
|---|---|---|
| EP | 277003 | 8/1988 |
| EP | 0573120 A | 12/1993 |
| EP | 608369 | 8/1994 |
| EP | 615981 A | 9/1994 |
| WO | WO-9308221 | 4/1993 |
| WO | WO-9407928 | 4/1994 |
| WO | WO-9407930 | 4/1994 |
| WO | WO-9425495 | 11/1994 |
| WO | WO-9428032 | 12/1994 |
| WO | WO-9514044 | 5/1995 |
| WO | WO-9807515 | 2/1998 |
| WO | WO-9809996 | 3/1998 |
| WO | WO-9832775 | 7/1998 |
| WO | WO-9915534 | 4/1999 |
| WO | WO-9918135 | 4/1999 |
| WO | WO-9942467 | 8/1999 |
| WO | WO-9945041 | 9/1999 |
| WO | WO-0024793 | 5/2000 |
| WO | WO-0238628 | 5/2002 |
| WO | WO-03010171 | 2/2003 |
| WO | WO-03040195 | 5/2003 |
| WO | WO-03102042 | 12/2003 |
| WO | WO-2006020624 | 2/2006 |

OTHER PUBLICATIONS

Mayo, Frank R., & Walling, Cheves (1950). Copolymerization. *Chemical Reviews*. 46(2), 191-287.

Odian, G. (2004). *Principles of Polymerization*. Hoboken: Wiley. p. 680.

Resconi, Luigi et al. (2005).C1-Symmetric Heterocyclic Zirconocenes as Catalysts . . . *Macro. Chem. and Phys.*. 206(14), 1405-1438.

Schellenberg, Jurger (2005).Coordination polymerization at very low amounts of methlaluminoxane as cocatalyst. *European Polymer Journal*. 41, 3026-3030.

* cited by examiner

HIGH EFFICIENCY SOLUTION POLYMERIZATION PROCESS

CROSS REFERENCE STATEMENT

This application is a national stage entry of PCT/US07/09843 filed Apr. 24, 2007, and claims the benefit of U.S. Provisional Application 60/801,182, filed May 17, 2006.

BACKGROUND OF THE INVENTION

Higher temperature solution processes for olefin polymerization are highly desirable due to the increased throughput, decreased energy necessary for devolatization and decreased fouling that these higher temperatures afford. Although Ziegler-Natta catalyst systems can be run at high temperatures commercially, these catalysts suffer from poor efficiency and poor comonomer incorporation at elevated temperatures. In addition, polymers produced from Ziegler-Natta catalysts at elevated temperatures have broadened molecular weight distributions, which limits their suitability for use in many applications. Conventional Ziegler-Natta catalysts are typically composed of many types of catalytic species, each having different metal oxidation states and different coordination environments with ligands. Examples of such heterogeneous systems are known and include metal halides activated by an organometallic co-catalyst, such as titanium chloride supported on magnesium chloride, activated with organoaluminum and organoaluminumhalide cocatalysts. Because these systems contain more than one catalytic species, they possess polymerization sites with different activities and varying abilities to incorporate comonomer into a polymer chain. The consequence of such multi-site chemistry is a product with poor control of the polymer chain architecture. Moreover, differences in the individual catalyst site produce polymers of high molecular weight at some sites and low molecular weight at others, resulting in a polymer with a broad molecular weight distribution and a heterogeneous composition. Due to this heterogeneity, mechanical and other properties of the polymers may be less than desired.

More recently, catalyst compositions based on well defined metal complexes, especially transition metal complexes such as constrained geometry catalysts (CGCs), metallocenes and post-metallocenes have been shown to give products having better comonomer incorporation and narrow molecular weight distribution. However, these catalysts often have poor high temperature stability and suffer from poor efficiencies at elevated polymerization temperatures. Additionally, the molecular weight of the polymers formed from these catalysts often decreases dramatically with increasing temperature, especially for polymers containing significant amounts of comonomer (lower density). That is, the ability of most olefin polymerization catalysts to incorporate higher α-olefins in an ethylene/α-olefin copolymer decreases with increasing polymerization temperature, due to the fact that the reactivity ratio, $r_1$, is directly related to polymerization temperature.

Reactivity ratios of catalysts may be obtained by known methods, for example, the technique described in "Linear Method for Determining Monomer Reactivity Ratios in Copolymerization", M. Fineman and S. D. Ross, *J. Polymer Science*, 5, 259 (1950) or "Copolymerization", F. R. Mayo and C. Walling, *Chem. Rev.*, 46, 191 (1950). One widely used copolymerization model is based on the following equations:

  (1)

  (2)

  (3)

  (4)

where $M_i$ refers to a monomer molecule which is arbitrarily designated as "i" where i=1, 2; and $M_2^*$ refers to a growing polymer chain to which monomer i has most recently attached.

The $k_{ij}$ values are the rate constants for the indicated reactions. For example, in ethylene/propylene copolymerization, $k_{11}$ represents the rate at which an ethylene unit inserts into a growing polymer chain in which the previously inserted monomer unit was also ethylene. The reactivity ratios follow as: $r_1=k_{11}/k_{12}$ and $r_2=k_{22}/k_{21}$ wherein $k_{11}$, $k_{12}$, $k_{22}$ and $k_{21}$ are the rate constants for ethylene (1) or propylene (2) addition to a catalyst site where the last polymerized monomer is an ethylene ($k_{1X}$) or propylene ($k_{2X}$).

In addition, known post metallocene catalyst compositions generally employ alumoxane cocatalysts in an amount to provide molar ratios based on metal complex from 500 to 1000 or higher or, alternatively, use cationic activating cocatalysts, such as ammonium salts of noncoordinating anions, principally, tetraalkylammonium salts of tetrakis (pentafluorophenyl)borate. These activators are expensive, especially when large amounts are necessary for catalyst activation. In addition, such catalyst compositions can result in higher catalyst residues or metal values in the polymer, which detracts from polymer properties, especially electrical properties such as dielectric properties, clarity or color (yellowness).

Thus, an olefin polymerization process is sought in which polymers containing various amounts of comonomer content can be produced with high catalyst efficiency and high monomer conversions and good reactor efficiencies without suffering from poor overall molecular weight. In addition, polymers having low molecular weight distribution or polydispersity ($M_W/M_N$<3.0) but relatively high $I_{10}/I_2$, are desired in such a process. Ideally, such a process could be carried out at elevated temperatures and still produce polymers having high molecular weight and relatively high comonomer incorporation as indicated by reduced density. It is known in the art that polymer molecular weight is readily controlled by use of chain transfer agents such as hydrogen or organometal compounds, such as trialkylaluminum or dialkylzinc compounds. Thus, a high temperature polymerization process that is capable of high levels of comonomer incorporation and which produces high molecular weight polymers having low molecular weight distributions and high $I_{10}/I_2$ values is desired in the art. Such a process additionally including a chain transfer agent to produce lower molecular weight polymers and/or incorporation of long chain branching is further desired.

In US 2005/0215737 A1, a continuous, solution, olefin polymerization process is disclosed for preparing ethylene-butene and ethylene-propylene interpolymers at high ethylene conversions. Disadvantageously, the resulting polymers were primarily plastomers having relatively low molecular weights. No chain transfer agent was employed, indicating that the inherent potential of the catalyst to produce a high molecular weight polymer was relatively low and catalyst efficiencies were also low, especially at higher reaction temperatures. It is well known that one function of a chain transfer agent is to lower the resulting molecular weight of the product at a given set of reaction conditions. Therefore, the molecular weight which a catalyst produces at a given set of experimental reaction conditions in the absence of a chain transfer agent is generally the highest molecular weight that the catalyst is capable of producing, all other conditions being equal.

For the industrial production of high molecular weight polyolefins, especially in a continuous solution process, it is especially desirable to conduct the polymerization reaction under conditions of relatively high reactor temperature, with a high conversion of the olefin monomers to polymer and having a high solids content, all with high catalyst efficiency and high comonomer incorporation (if comonomer is utilized) in the presence of a chain transfer agent. This combination of process requirements severely restricts the choice of metal complex that can suitably be employed. Metal complexes that are suited for use under less demanding conditions may, in fact, be unacceptable for use under commercial processing conditions.

In WO 99/45041, another continuous, solution olefin polymerization process is disclosed using bridged hafnocene complexes with noncoordinating anionic cocatalysts. Although the resulting polymers contained significant amounts of comonomer, catalyst efficiencies were relatively low and polymer molecular weights, even in the absence of chain transfer agent, were less than desirable.

In WO 03/102042, a high temperature, solution olefin polymerization process is disclosed using indenoindolyl transition metal complexes to prepare polyolefins at temperatures greater than about 130° C. In one example, the copolymerization of ethylene and 1-hexene was carried out at 180° C. resulting in formation of a polymer having poor comonomer incorporation (density=0.937 g/cm$^3$) at relatively low catalyst efficiencies.

In U.S. Pat. No. 6,827,976, there are disclosed certain highly active polymerization catalysts comprising Group 3-6 or Lanthanide metal complexes, preferably Group 4 metal complexes, of bridged divalent aromatic ligands containing a divalent Lewis base chelating group. The metal complexes were employed in combination with activating cocatalysts in the polymerization of olefins including mixtures of ethylene and α-olefins, including 1-octene, to obtain polymers containing high comonomer incorporation rates at elevated temperatures.

We have now discovered that certain metal complexes may be employed in a solution polymerization process to prepare relatively high molecular weight ethylene containing interpolymers containing relatively large quantities of comonomer incorporated therein and high olefin conversions if certain process conditions are observed. Accordingly, there is now provided a process for the preparation of olefin polymer products, especially high molecular weight polyolefins, at very high catalyst efficiency. In addition, we have discovered that these catalyst compositions retain their high catalyst activity using relatively low molar ratios of conventional alumoxane cocatalysts. The use of reduced quantities of alumoxane cocatalysts (reduced by up to 90 percent or more, compared to the quantities employed in conventional processes) allows for the preparation of polymer products having reduced metal content and consequently increased clarity, improved dielectric properties and other enhanced physical properties. In addition, the use of reduced quantities of alumoxane cocatalysts results in reduction in polymer production costs. Especially desirably results are achieved by the use of certain trialkyl aluminum modified alumoxane cocatalysts. Moreover, by using alumoxane cocatalysts rather than salts of non-coordinating anions, such as tetraalkylammonium salts of tetrakis(pentafluorophenyl)borate, polymers having enhanced electrical properties, namely a decrease in 130° C. dissipation factor, can be attained.

SUMMARY OF THE INVENTION

According to the present invention there is now provided a process for polymerization of ethylene and one or more $C_{3-20}$ α-olefins under solution polymerization conditions with a catalyst composition comprising a zirconium complex of a polyvalent aryloxyether which affords interpolymers having narrow molecular weight distribution and improved dielectric properties.

Additionally, according to the invention it is possible to produce interpolymers possessing relatively high molecular weights (with correspondingly low melt indices) and high levels of comonomer incorporation (low densities), having relatively high $I_{10}/I_2$. This unique combination of polymer properties is attainable by use of low molar ratios (200 or less, preferably 100 or less, more preferably 80 or less, based on zirconium) of an alkylalumoxane cocatalyst or a trialkylaluminum-modified alumoxane cocatalyst. The polymers are capable of preparation under high temperature, high conversion conditions at high catalyst efficiencies.

The present invention is particularly advantageous for use under continuous solution polymerization conditions wherein a reaction mixture comprising a metal complex, an alumoxane activating cocatalyst, optionally a chain transfer agent, and at least one $C_{2-20}$ α-olefin is continuously added to a reactor operating under solution polymerization conditions, and polymer product is continuously or semi-continuously removed therefrom. In one embodiment, the invention is used to prepare copolymers of ethylene and at least one $C_{3-20}$ α-olefin, preferably ethylene and at least one $C_{3-8}$ α-olefin. In another embodiment, this invention can be used to prepare interpolymers comprising ethylene, a $C_{4-20}$ diene, especially ethylidene norbornene, and optionally one or more $C_{3-20}$ α-olefins, especially propylene. In addition, the process may employ the use of catalyst compositions comprising more than one metal complex or compound and/or multiple reactors.

The invention is particularly suitable for production of resins that are used in the insulation layer of electrical wires and cables, particularly in medium and high voltage applications.

DETAILED DESCRIPTION OF THE INVENTION

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight and all test methods are current as of the filing date hereof. For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, definitions (to the extent not inconsistent with any definitions provided herein) and general knowledge in the art.

The term "comprising" and derivatives thereof is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

As used herein with respect to a chemical compound, unless specifically indicated otherwise, the singular includes all isomeric forms and vice versa (for example, "hexane", includes all isomers of hexane individually or collectively). The terms "compound" and "complex" are used interchangeably herein to refer to organic-, inorganic- and organometal compounds. The term, "atom" refers to the smallest constituent of an element regardless of ionic state, that is, whether or not the same bears a charge or partial charge or is bonded to another atom. The term "heteroatom" refers to an atom other than carbon or hydrogen. Preferred heteroatoms include: F, Cl, Br, N, O, P, B, S, Si, Sb, Al, Sn, As, Se and Ge. The term "amorphous" refers to a polymer lacking a crystalline melting point as determined by differential scanning calorimetry (DSC) or equivalent technique.

The term, "hydrocarbyl" refers to univalent substituents containing only hydrogen and carbon atoms, including branched or unbranched, saturated or unsaturated, cyclic, polycyclic or noncyclic species. Examples include alkyl-, cycloalkyl-, alkenyl-, alkadienyl-, cycloalkenyl-, cycloalkadienyl-, aryl-, and alkynyl-groups. "Substituted hydrocarbyl" refers to a hydrocarbyl group that is substituted with one or more nonhydrocarbyl substituent groups. The terms, "heteroatom containing hydrocarbyl" or "heterohydrocarbyl" refer to univalent groups in which at least one atom other than hydrogen or carbon is present along with one or more carbon atom and one or more hydrogen atoms. The term "heterocarbyl" refers to groups containing one or more carbon atoms and one or more heteroatoms, but no hydrogen atoms. The bond between the carbon atom and any heteroatom as well as the bonds between any two heteroatoms, may be a single or multiple covalent bond or a coordinating or other donative bond. Thus, an alkyl group substituted with a heterocycloalkyl-, aryl-substituted heterocycloalkyl-, heteroaryl-, alkyl-substituted heteroaryl-, alkoxy-, aryloxy-, dihydrocarbylboryl-, dihydrocarbylphosphino-, dihydrocarbylamino-, trihydrocarbylsilyl-, hydrocarbylthio-, or hydrocarbylselenogroup is within the scope of the term heteroalkyl. Examples of specific heteroalkyl groups include cyanomethyl-, benzoylmethyl-, (2-pyridyl)methyl-, and trifluoromethyl-groups.

As used herein the term "aromatic" refers to a polyatomic, cyclic, conjugated ring system containing (4δ+2) π-electrons, wherein δ is an integer greater than or equal to 1. The term "fused" as used herein with respect to a ring system containing two or more polyatomic, cyclic rings means that with respect to at least two rings thereof, at least one pair of adjacent atoms is included in both rings. The term "aryl" refers to a monovalent aromatic substituent which may be a single aromatic ring or multiple aromatic rings which are fused together, linked covalently, or linked to a common group such as a methylene or ethylene moiety. Examples of aromatic ring(s) include phenyl, naphthyl, anthracenyl, and biphenyl, among others.

"Substituted aryl" refers to an aryl group in which one or more hydrogen atoms bound to any carbon is replaced by one or more functional groups such as alkyl, substituted alkyl, cycloalkyl, substituted cycloalkyl, heterocycloalkyl, substituted heterocycloalkyl, halogen, alkylhalos (for example, $CF_3$), hydroxy, amino, phosphido, alkoxy, amino, thio, nitro, and both saturated and unsaturated cyclic hydrocarbons which are fused to the aromatic ring(s), linked covalently or linked to a common group such as a methylene or ethylene moiety. The common linking group may also be a carbonyl as in benzophenone, or oxygen as in diphenylether, or nitrogen as in diphenylamine.

Embodiments of the invention provide a new solution process for making olefin polymers using a catalyst composition comprising a transition metal complex at high temperature, high catalyst efficiency and high monomer conversion, wherein the produced polymers are of sufficiently high molecular weight so as to still allow for the presence of significant amounts of a chain transfer agent such as hydrogen to control molecular weight of the polymers. Highly desirably, the produced polymers are of high molecular weight ($I_2 < 5.0$) and can be of variable density (due to varying amounts of comonomer incorporation). Particularly of interest is the ability to produce high molecular weight, high comonomer-content ethylene interpolymers under these high temperature, high conversion conditions with very high catalyst efficiency. These polymers desirably have narrow molecular weight distributions ($M_w/M_n < 3.0$) and can give high levels of long chain branching as measured by $I_{10}/I_2$, preferably having $I_{10}/I_2 \geq 10$. Such polymers are suitably employed where improved extrusion performance is desired, such as in molding and extrusion grades of polymer especially for film, foam or wire and cable insulating applications.

The term "polymer" as used herein refers to a macromolecular compound prepared by polymerizing one or more monomers. A polymer refers to homopolymers, copolymers, terpolymers, interpolymers, and so on. The term "interpolymer" is used herein interchangeably with the term copolymer to refer to polymers incorporating in polymerized form at least two copolymerizable monomers, or incorporating long chain branching as a result of chain termination/olefin formation reactions in situ, and reincorporation of the in situ formed olefin. Accordingly, copolymers may result from the polymerization of a single monomer, under the correct operating conditions. The least prevalent monomer in the resulting copolymer or interpolymer is generally referred to by the term "comonomer". The chain length of the resulting long chain branches referred to above, is consequently longer than the carbon length resulting from polymerization of any deliberately added comonomer, and in particular, longer than 6 carbons. The presence of long chain branching may also be detected by the increased shear sensitivity of the polymer, as disclosed in EP-A-608,369, and elsewhere, or determined by Melt Index Ratio (MIR), a ratio of polymer melt viscosities measured under differing loads, especially $I_{21}/I_2$. Preferred polymers according to the invention have MIR values from 30 to 80.

The process described herein may be employed to prepare any olefin interpolymer, especially copolymers of ethylene with one or more $C_{3-20}$ olefins, and optionally one or more $C_{4-20}$ diolefins, and, especially, ethylene/propylene, ethylene/1-butene, ethylene/1-hexene, ethylene/4-methyl-1-pentene, ethylene/styrene, ethylene/propylene/styrene, and ethylene/1-octene copolymers, as well as copolymers of ethylene, propylene and a non-conjugated diene, for example, EPDM interpolymers.

Polymerization conditions generally refer to temperature, pressure, monomer content (including comonomer concentration), catalyst concentration, cocatalyst concentration, monomer conversion, or other conditions that influence the properties of the resulting polymer. By operation according to the prescribed polymerization conditions of the invention high molecular weight polymers may be prepared having relatively high comonomer incorporation with high catalyst activities, low cocatalyst usage and high $I_{10}/I_2$ or MIR. In particular, activities (based on weight of polymer to weight of transition metal) greater than 0.5 g/μg, preferably greater than 0.55 g/μg, and even greater than 0.6 g/μg are possible.

Polymer weight-average molecular weight ($M_w$) is measured by gel permeation chromatography, one technique of which as described in U.S. Pat. No. 5,272,236. Alternatively, melt index, $I_2$, $I_{10}$ or $I_{21}$, measured, for example, according to ASTM D-1238 may be employed as an indication of molecular weight. Generally, melt index is inversely related to the molecular weight of the polymer. The higher the molecular weight, the lower the melt index, although the relationship is not necessarily linear.

One embodiment of this invention entails a process which comprises contacting ethylene and one or more $C_{3-20}$ α-olefins in a solution polymerization process. The present invented process is particularly advantageous for use under polymerization conditions wherein a reaction mixture comprising metal complex, alumoxane activating cocatalyst, ethylene, and at least one $C_{3-20}$ α-olefin comonomer (or the individual components thereof) is continuously or intermittently added to a reactor operating under solution polymerization conditions, optionally in the additional presence of a chain transfer agent, and polymerized product is continuously or semi-continuously removed therefrom. This process can consist of:

1) Polymerizing ethylene and one or more $C_{3-20}$ α-olefins and or diolefins using a zirconium complex and from 10 to 200 moles per mole zirconium of an alumoxane, under continuous, solution polymerization conditions at a temperature from 150 to 250° C., preferably from 180 to 250° C., under high ethylene conversion conditions (>85 percent, preferably >90 percent) which results in a polymer with a density between 0.885 and 0.950 g/cm³ and a low melt index ($I_2<2.0$) with a narrow molecular weight distribution (Mw/Mn<3.0, preferably <2.7, especially <2.5) with a catalyst efficiency of greater than 0.5 $g_{polymer}/\mu g_{metal}$, and low catalyst and cocatalyst residues producing a polymer having a dissipation factor at 130° C. of less than 1 percent, preferably less than 0.5 percent and even more preferably less than 0.25 percent.

When a chain transfer agent is utilized, a sufficient quantity is used so that a substantial decrease in molecular weight (>30 percent) occurs compared to a comparative polymerization without the use of chain transfer agent. When the chain transfer agent is hydrogen, at least 0.015 mol percent (based on ethylene) is used, and a maximum of about 2 mol percent is used. In addition, this process can be used to produce polymers which contain significant amounts of long chain branches, as indicated by the polymer having $I_{10}/I_2 \geq 10$ for polymers having an $I_2<5$.

2) Polymerizing ethylene and one or more $C_{3-20}$ α-olefins, preferably one or more $C_{6-20}$ α-olefins, using a zirconium complex and a trialkyl aluminum modified alumoxane, under continuous, solution polymerization conditions, optionally in the presence of a chain transfer agent at a temperature from 130 to 250° C. under high ethylene conversion conditions (>85 percent, preferably >90 percent) which results in a polymer with a density between 0.865 and 0.884 g/cm³ and a low melt index ($I_2<2.0$) with a narrow molecular weight distribution (Mw/Mn<3.0, preferably <2.5, especially <2.3) and a catalyst efficiency of greater than 0.5 $g_{polymer}/\mu g_{metal}$, and low catalyst and cocatalyst residues producing a polymer having a dissipation factor at 130° C. of less than 1 percent, preferably less than 0.5 percent and even more preferably less than 0.25 percent.

A sufficient quantity of chain transfer agent is preferably used so that a substantial decrease in molecular weight (>30 percent) occurs compared to a comparative polymerization without the use of chain transfer agent. When the chain transfer agent is hydrogen, at least 0.015 mol percent (based on ethylene) is used, and a maximum of about 2 mol percent is used. Highly desirably the polymers have melt index of less than 5, preferably less than 2. In addition, this process can be used to produce polymers which contain significant amounts of long chain branches, preferably resulting in polymers having $I_{10}/I_2$ from 10 to 20.

3) Polymerizing ethylene and one or more $C_{3-20}$ α-olefins, especially 1-octene, using a zirconium complex and an alumoxane activating cocatalyst, under continuous, solution polymerization conditions in the presence of a chain transfer agent, especially hydrogen, at a temperature from 130 to 250° C. which results in a polymer with a low or medium melt index ($I_2<10.0$), a narrow molecular weight distribution (Mw/Mn<3.0, preferably <2.5, especially <2.3) and low catalyst and cocatalyst residues producing a polymer having a dissipation factor at 130° C. of less than 1 percent, preferably less than 0.5 percent and even more preferably less than 0.25 percent.

4) Polymerizing ethylene and one or more $C_{3-20}$ α-olefins, especially propylene and a diolefin to make EPDM, using a zirconium complex and an alumoxane activating cocatalyst, under continuous, solution polymerization conditions in the presence of a chain transfer agent, especially hydrogen, at a temperature from 120 to 250° C. which results in a polymer with a low melt index ($I_2<2.0$), a narrow molecular weight distribution (Mw/Mn<3.0) and low catalyst and cocatalyst residues producing a polymer having a dissipation factor at 130° C. of less than 1 percent, preferably less than 0.5 percent and even more preferably less than 0.25 percent.

Surprisingly, the present metal complexes are capable of producing polymers of extremely high molecular weight under a variety of polymerization conditions while retaining a narrow molecular weight distribution (<3.0) and a catalyst efficiency of greater than 0.5 $g_{polymer}/\mu g_{metal}$, thereby allowing the use of a chain transfer agent to control molecular weight without sacrificing molecular weight distribution or long chain branching content. A sufficient quantity of chain transfer agent is preferably used so that a substantial decrease in molecular weight (>30 percent) occurs compared to a comparative polymerization without the use of chain transfer agent. When the chain transfer agent is hydrogen, at least 0.01 mol percent (based on ethylene) is used, and a maximum of about 2 mol percent is used. Especially surprising is the fact that very low density (high comonomer content) polymers can be prepared with high levels of chain transfer agents, while still affording polymers with high $I_{10}/I_2$ using low levels of alumoxane activators. Generally, use of high levels of chain transfer agent and high levels of comonomer produces increased levels of non-polymerizable end-groups, resulting in a reduction of long chain branch formation and production of polymers having low $I_{10}/I_2$.

Suitable alumoxanes include polymeric or oligomeric alumoxanes, especially methylalumoxane (MAO) as well as Lewis acid-modified alumoxanes, especially trihydrocarbylaluminum-, halogenated tri(hydrocarbyl)aluminum- or halogenated tri(hydrocarbyl)boron-modified alumoxanes, having from 1 to 10 carbons in each hydrocarbyl or halogenated hydrocarbyl group. Such activating cocatalysts are previously disclosed in U.S. Pat. Nos. 6,214,760, 6,160,146, 6,140,521, and 6,696,379, and elsewhere. Preferred Lewis acid-modified alumoxane compounds are tri(i-butyl)aluminum-modified methalumoxane and tri(n-octyl)aluminum-modified methalumoxane containing from 10 to 30, preferably 15 to 25 mole percent i-butyl content and 10 to 20, preferably 12 to 18 mole percent n-octyl contents, respectively, said molar percents based on total alkyl ligand content. The alumoxane or Lewis acid-modified alumoxane activator is preferably utilized in molar ratios cocatalyst:catalyst from 20-200, more preferably from 20-150, and most preferably from 20-80.

Because of the ability to be activated at relatively low levels of alumoxane or Lewis acid modified alumoxane cocatalysts while maintaining high catalyst efficiency, the present zirconium complexes achieve reduced levels of cocatalyst byproducts in the resulting polymer. This in turn allows the polymers to be employed in demanding applications that have been previously unsuited for ethylene/α-olefin interpolymers, such as wire and cable electrical insulation, particularly for medium and high voltage applications which demand excellent electrical properties.

Multiple reactor polymerization processes are suitably employed in the present invention. Examples include such systems as are disclosed in U.S. Pat. No. 3,914,342, among others. The multiple reactors can be operated in series or in parallel, with at least one catalyst composition according to the present invention employed in at least one of the reactors. One or both reactors may also contain at least two catalysts which have different comonomer incorporation capability and/or different molecular weight capability. In one embodiment, a relatively high molecular weight product ($M_w$ from 100,000 to over 1,000,000, more preferably 200,000 to 500,000) is formed while in the second reactor a product of a relatively low molecular weight ($M_w$ 2,000 to 300,000) is formed. Both of these reactor products can have similar or different densities. The final product is a mixture of the two reactor effluents which are combined prior to devolatilization to result in a uniform mixing of the two polymer products. In another embodiment, the molecular weight of the products from both reactors is nearly the same but the densities vary to the extent that one of the reactors produces a polymer with density in the range of 0.865-0.895, while the other reactor produces polymer with a different density in the range of 0.885-0.950. Such a dual reactor/dual catalyst process allows for the preparation of products with tailored properties. In one embodiment, the reactors are connected in series, that is, the effluent from the first reactor is charged to the second reactor and fresh monomer, solvent and hydrogen is optionally added to the second reactor. Reactor conditions are adjusted such that the weight ratio of polymer produced in the first reactor to that produced in the second reactor is ideally in the range from 20:80 to 80:20. It will be appreciated by the skilled artisan that the foregoing dual reactor process is capable of producing polymers having broadened molecular weight distribution or polydispersity index (PDI). Preferred polymers made in the foregoing manner have PDI from 2.8 to 6.0, more preferably from 3.0 to 5.0. In addition, in a desirable embodiment, the high molecular weight component contains higher quantities of comonomer (lower density) than the low molecular weight component.

In one embodiment, one of the reactors in the polymerization process, including the first of two reactors operating in series, contains a heterogeneous Ziegler-Natta catalyst or a chromium containing catalyst, such as one of the numerous such catalysts known in the art. Examples of Ziegler-Natta catalysts include, but are not limited to, titanium-based catalysts supported on $MgCl_2$, and additionally comprise compounds of aluminum containing at least one aluminum-alkyl bond. Suitable Ziegler-Natta catalysts and their preparation include, but are not limited to, those disclosed in U.S. Pat. Nos. 4,612,300, 4,330,646, and 5,869,575. Suitable chromium based catalysts are those disclosed in U.S. Pat. Nos. 4,981,927, 4,835,219, 4,564,660, 4,173,548, 3,953,413, and elsewhere.

Single reactor, multiple catalyst processes are also useful in the present invention. In one embodiment, two or more catalysts are introduced into a single reactor at the high temperature conditions that are herein disclosed, wherein each catalyst inherently produces different polyolefin copolymers. In one embodiment, a relatively high molecular weight product ($M_w$ from 100,000 to over 1,000,000, more preferably 200,000 to 500,000) is formed from one catalyst while a product of a relatively low molecular weight ($M_w$ 2,000 to 300,000) is formed from the other catalyst. Both of these catalyst compositions can have similar or different comonomer incorporation ability. The resulting polymer will have properties dependant on the ratio of the two catalysts that are employed in the single reactor. Suitable combinations of polymer molecular weight, comonomer incorporation ability, processes, and ratios of catalysts for such products are disclosed in U.S. Pat. No. 6,924,342. Due to the unique compatibility of the present catalyst compositions with other olefin polymerization catalysts, including Ziegler/Natta catalysts, the second catalyst composition may comprise a metal complex as herein disclosed, a metallocene or other π-bonded ligand group containing metal complex (including constrained geometry metal complexes), or a polyvalent heteroatom ligand group containing metal complex, especially polyvalent pyridylamine or imidizolylamine based complexes and tetradendate oxygen-ligated biphenylphenol based Group 4 metal complexes.

Metal Complexes

Suitable metal complexes for use according to the present invention include compounds corresponding to the formula:

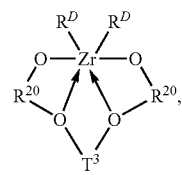

where:

$R^{20}$ independently each occurrence is a divalent aromatic or inertly substituted aromatic group containing from 5 to 20 atoms not counting hydrogen;

$T^3$ is a divalent hydrocarbon or silane group having from 1 to 20 atoms not counting hydrogen, or an inertly substituted derivative thereof; and $R^D$ independently each occurrence is a monovalent ligand group of from 1 to 20 atoms, not counting hydrogen, or two $R^D$ groups together are a divalent ligand group of from 1 to 20 atoms, not counting hydrogen.

Preferably, such complexes correspond to the formula:

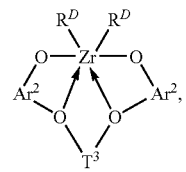

wherein:

Ar² independently each occurrence is an arylene or an alkyl-, aryl-, alkoxy- or amino-substituted arylene group of from 6 to 20 atoms not counting hydrogen or any atoms of any substituent;

T³ is a divalent hydrocarbon bridging group of from 2 to 20 atoms not counting hydrogen, preferably a divalent substituted or unsubstituted $C_{3-6}$ aliphatic, cycloaliphatic, or bis(alkylene)-substituted cycloaliphatic group; and $R^D$ independently each occurrence is a monovalent ligand group of from 1 to 20 atoms, not counting hydrogen, or two $R^D$ groups together are a divalent ligand group of from 1 to 40 atoms, not counting hydrogen.

More preferred examples of metal complexes suitable for use herein include compounds of the formula:

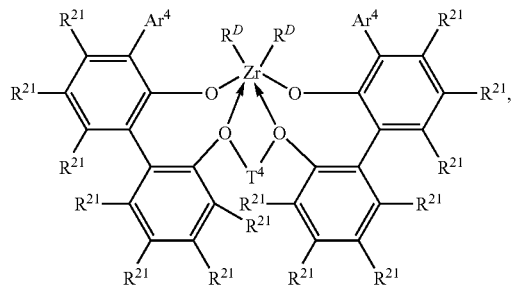

where

Ar⁴ independently each occurrence is $C_{6-20}$ aryl or inertly substituted derivatives thereof, especially 3,5-di(isopropyl)phenyl, 3,5-di(isobutyl)phenyl, dibenzo-1H-pyrrole-1-yl, naphthyl, anthracen-5-yl, 1,2,3,4,6,7,8,9-octahydroanthracen-5-yl;

T⁴ independently each occurrence is a propylene-1,3-diyl group, a cyclohexan-1,2-diyl group, a bis(alkylene)cyclohexan-1,2-diyl group, a cyclohexen-4,5-diyl group, or an inertly substituted derivative thereof;

$R^{21}$ independently each occurrence is hydrogen, halo, hydrocarbyl, trihydrocarbylsilyl, trihydrocarbylsilylhydrocarbyl, alkoxy or amino of up to 50 atoms not counting hydrogen; and $R^D$, independently each occurrence is halo or a hydrocarbyl or trihydrocarbylsilyl group of up to 20 atoms not counting hydrogen, or 2 $R^D$ groups together are a divalent hydrocarbylene, hydrocarbadiyl or trihydrocarbylsilyl group of up to 40 atoms not counting hydrogen.

Especially preferred metal complexes are compounds of the formula:

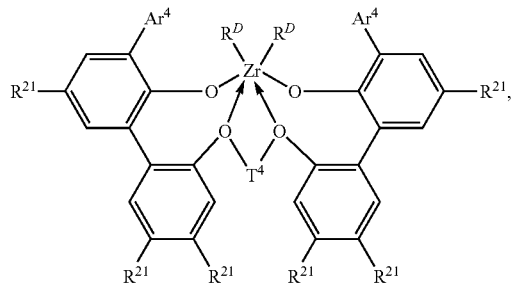

where, Ar⁴, independently each occurrence, is 3,5-di(isopropyl)phenyl, 3,5-di(isobutyl)phenyl, dibenzo-1H-pyrrole-1-yl, or anthracen-5-yl, $R^{21}$ independently each occurrence is hydrogen, halo, hydrocarbyl, trihydrocarbylsilyl, trihydrocarbylsilylhydrocarbyl, alkoxy or amino of up to 50 atoms not counting hydrogen;

T⁴ is propan-1,3-diyl, cyclohexanediyl, cyclohexen-4,5-diyl, or bis(methylene)cyclohexan-1,2-diyl; and $R^D$, independently each occurrence is halo or a hydrocarbyl or trihydrocarbylsilyl group of up to 20 atoms not counting hydrogen, or 2 $R^D$ groups together are a hydrocarbylene, hydrocarbadiyl or hydrocarbylsilanediyl group of up to 40 atoms not counting hydrogen.

Compared to metal complexes comprising a 1,4-butandiyl group, the foregoing complexes demonstrate improved catalyst efficiencies, especially at elevated polymerization temperatures. Most highly preferred metal complexes according to the invention correspond to the formulas:

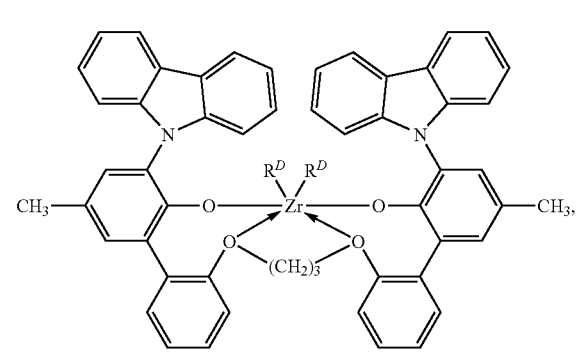

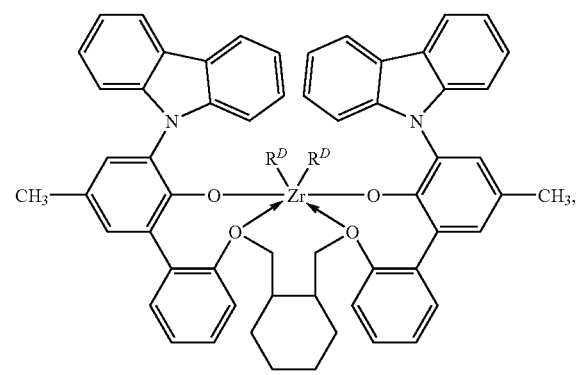

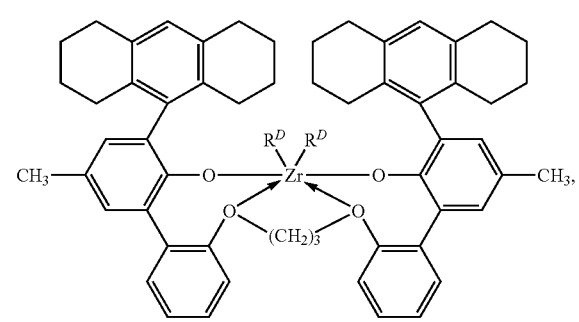

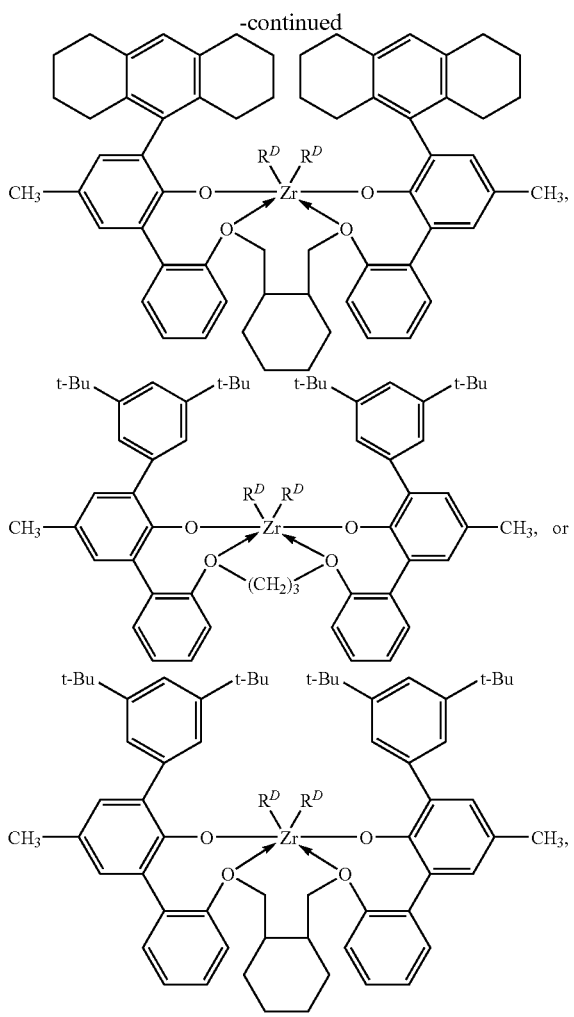

wherein, $R^D$ independently each occurrence is chloro, methyl or benzyl.

Specific examples of suitable metal complexes are the following compounds:

A) bis((2-oxoyl-3-(1,2,3,4,6,7,8,9-octahydroanthracen-5-yl)-5-(methyl)phenyl)-2-phenoxy)-1,3-propanediylzirconium (IV) dimethyl,
bis((2-oxoyl-3-(1,2,3,4,6,7,8,9-octahydroanthracen-5-yl)-5-(methyl)phenyl)-2-phenoxy)-1,3-propanediylzirconium (IV) dichloride,
bis((2-oxoyl-3-(1,2,3,4,6,7,8,9-octahydroanthracen-5-yl)-5-(methyl)phenyl)-2-phenoxy)-1,3-propanediylzirconium (IV) dibenzyl,
bis((2-oxoyl-3-(dibenzo-1H-pyrrole-1-yl)-5-(methyl)phenyl)-2-phenoxy)-1,3-propanediylzirconium (IV) dimethyl,
bis((2-oxoyl-3-(dibenzo-1H-pyrrole-1-yl)-5-(methyl)phenyl)-2-phenoxy)-1,3-propanediylzirconium (IV) dichloride,
bis((2-oxoyl-3-(dibenzo-1H-pyrrole-1-yl)-5-(methyl)phenyl)-2-phenoxy)-1,3-propanediylzirconium (IV) dibenzyl,
bis((2-oxoyl-3-(3,5-di-(1,1-dimethylethyl)phenyl)-5-(methyl)phenyl)-2-phenoxy)-1,3-propanediylzirconium (IV) dimethyl,
bis((2-oxoyl-3-(3,5-di-(1,1-dimethylethyl)phenyl)-5-(methyl)phenyl)-2-phenoxy)-1,3-propanediylzirconium (IV) dichloride,
bis((2-oxoyl-3-(3,5-di-(1,1-dimethylethyl)phenyl)-5-(methyl)phenyl)-2-phenoxy)-1,3-propanediylzirconium (IV) dibenzyl,
bis((2-oxoyl-3-(1,2,3,4,6,7,8,9-octahydroanthracen-5-yl)-5-(methyl)phenyl)-2-phenoxymethyl)-trans-1,2-cyclohexanediylzirconium (IV) dimethyl,
bis((2-oxoyl-3-(1,2,3,4,6,7,8,9-octahydroanthracen-5-yl)-5-(methyl)phenyl)-2-phenoxymethyl)-trans-1,2-cyclohexanediylzirconium (IV) dichloride,
bis((2-oxoyl-3-(1,2,3,4,6,7,8,9-octahydroanthracen-5-yl)-5-(methyl)phenyl)-2-phenoxymethyl)-trans-1,2-cyclohexanediylzirconium (IV) dibenzyl,
bis((2-oxoyl-3-(dibenzo-1H-pyrrole-1-yl)-5-(methyl)phenyl)-2-phenoxymethyl)-trans-1,2-cyclohexanediylzirconium (IV) dimethyl,
bis((2-oxoyl-3-(dibenzo-1H-pyrrole-1-yl)-5-(methyl)phenyl)-2-phenoxymethyl)-trans-1,2-cyclohexanediylzirconium (IV) dichloride,
bis((2-oxoyl-3-(dibenzo-1H-pyrrole-1-yl)-5-(methyl)phenyl)-2-phenoxymethyl)-trans-1,2-cyclohexanediylzirconium (IV) dibenzyl,
bis((2-oxoyl-3-(3,5-di-(1,1-dimethylethyl)phenyl)-5-(methyl)phenyl)-2-phenoxymethyl)-trans-1,2-cyclohexanediylzirconium (IV) dimethyl,
bis((2-oxoyl-3-(3,5-di-(1,1-dimethylethyl)phenyl)-5-(methyl)phenyl)-2-phenoxymethyl)-trans-1,2-cyclohexanediylzirconium (IV) dichloride,
bis((2-oxoyl-3-(3,5-di-(1,1-dimethylethyl)phenyl)-5-(methyl)phenyl)-2-phenoxymethyl)-trans-1,2-cyclohexanediylzirconium (IV) dibenzyl,
bis((2-oxoyl-3-(1,2,3,4,6,7,8,9-octahydroanthracen-5-yl)-5-(methyl)phenyl)-2-phenoxy)-cis-1,3-cyclohexanediylzirconium (IV) dimethyl,
bis((2-oxoyl-3-(1,2,3,4,6,7,8,9-octahydroanthracen-5-yl)-5-(methyl)phenyl)-2-phenoxy)-cis-1,3-cyclohexanediylzirconium (IV) dichloride,
bis((2-oxoyl-3-(1,2,3,4,6,7,8,9-octahydroanthracen-5-yl)-5-(methyl)phenyl)-2-phenoxy)-cis-1,3-cyclohexanediylzirconium (IV) dibenzyl,
bis((2-oxoyl-3-(dibenzo-1H-pyrrole-1-yl)-5-(methyl)phenyl)-2-phenoxy)-cis-1,3-cyclohexanediylzirconium (IV) dimethyl,
bis((2-oxoyl-3-(dibenzo-1H-pyrrole-1-yl)-5-(methyl)phenyl)-2-phenoxy)-cis-1,3-cyclohexanediylzirconium (IV) dichloride,
bis((2-oxoyl-3-(dibenzo-1H-pyrrole-1-yl)-5-(methyl)phenyl)-2-phenoxy)-cis-1,3-cyclohexanediylzirconium (IV) dibenzyl
bis((2-oxoyl-3v-5-(methyl)phenyl)-2-phenoxy)-cis-1,3-cyclohexanediylzirconium (IV) dimethyl,
bis((2-oxoyl-3-(3,5-di-(1,1-dimethylethyl)phenyl)-5-(methyl)phenyl)-2-phenoxy)-cis-1,3-cyclohexanediylzirconium (IV) dichloride,
bis((2-oxoyl-3-(3,5-di-(1,1-dimethylethyl)phenyl)-5-(methyl)phenyl)-2-phenoxy)-cis-1,3-cyclohexanediylzirconium (IV) dibenzyl,
bis((2-oxoyl-3-(1,2,3,4,6,7,8,9-octahydroanthracen-3-yl)-5-(methyl)phenyl)-2-phenoxy)-cis-4,5-cyclohexenediylzirconium (IV) dimethyl,
bis((2-oxoyl-3-(1,2,3,4,6,7,8,9-octahydroanthracen-5-yl)-5-(methyl)phenyl)-2-phenoxy)-cis-4,5-cyclohexenediylzirconium (IV) dichloride,
bis((2-oxoyl-3-(1,2,3,4,6,7,8,9-octahydroanthracen-5-yl)-5-(methyl)phenyl)-2-phenoxy)-cis-4,5-cyclohexenediylzirconium (IV) dibenzyl, bis((2-oxoyl-3-(dibenzo-1H-pyrrole-1-yl)-5-(methyl)phenyl)-2-phenoxy)-cis-4,5-cyclohexenediylzirconium (IV) dimethyl,
bis((2-oxoyl-3-(dibenzo-1H-pyrrole-1-yl)-5-(methyl)phenyl)-2-phenoxy)-cis-4,5-cyclohexenediylzirconium (IV) dichloride,
bis((2-oxoyl-3-(dibenzo-1H-pyrrole-1-yl)-5-(methyl)phenyl)-2-phenoxy)-cis-4,5-cyclohexenediylzirconium (IV) dibenzyl
bis((2-oxoyl-3-(3,5-di-(1,1-dimethylethyl)phenyl)-5-(methyl)phenyl)-2-phenoxy)-cis-4,5-cyclohexenediylzirconium (IV) dimethyl,
bis((2-oxoyl-3-(3,5-di-(1,1-dimethylethyl)phenyl)-5-(methyl)phenyl)-2-phenoxy)-cis-4,5-cyclohexenediylzirconium (IV) dichloride,
bis((2-oxoyl-3-(3,5-di-(1,1-dimethylethyl)phenyl)-5-(methyl)phenyl)-2-phenoxy)-cis-4,5-cyclohexenediylzirconium (IV) dibenzyl,
B) bis((2-oxoyl-3-(1,2,3,4,6,7,8,9-octahydroanthracen-5-yl)-5-(methyl)phenyl)-(4-methyl-2-phenoxy)-1,3-propanediylzirconium (IV) dimethyl,
bis((2-oxoyl-3-(1,2,3,4,6,7,8,9-octahydroanthracen-1-yl)-5-(methyl)phenyl)-(4-rethyl-2-phenoxy)-1,3-propanediylzirconium (IV) dichloride,
bis((2-oxoyl-3-(1,2,3,4,6,7,8,9-octahydroanthracen-1-yl)-5-(methyl)phenyl)-(4-methyl-2-phenoxy)-1,3-propanediylzirconium (IV) dibenzyl,
bis((2-oxoyl-3-(dibenzo-1H-pyrrole-1-yl)-5-(methyl)phenyl)-(4-methyl-2-phenoxy)-1,3-propanediylzirconium (IV) dimethyl,
bis((2-oxoyl-3-(dibenzo-1H-pyrrole-1-yl)-5-(methyl)phenyl)-(4-methyl-2-phenoxy)-1,3-propanediylzirconium (IV) dichloride,
bis((2-oxoyl-3-(dibenzo-1H-pyrrole-1-yl)-5-(methyl)phenyl)-(4-methyl-2-phenoxy)-1,3-propanediylzirconium (IV) dibenzyl
bis((2-oxoyl-3-(3,5-di-(1,1-dimethylethyl)phenyl)-5-(methyl)phenyl)-(4-methyl-2-phenoxy)-1,3-propanediylzirconium (IV) dimethyl,
bis((2-oxoyl-3-(3,5-di-(1,1-dimethylethyl)phenyl)-5-(methyl)phenyl)-(4-methyl-2-phenoxy)-1,3-propanediylzirconium (IV) dichloride,
bis((2-oxoyl-3-(3,5-di-(1,1-dimethylethyl)phenyl)-5-(methyl)phenyl)-(4-methyl-2-phenoxy)-1,3-propanediylzirconium (IV) dibenzyl,
bis((2-oxoyl-3-(1,2,3,4,6,7,8,9-octahydroanthracen-5-yl)-5-(methyl)phenyl)-(4-methyl-2-phenoxymethyl)trans-1,2-cyclohexanediylzirconium (IV) dimethyl,
bis((2-oxoyl-3-(1,2,3,4,6,7,8,9-octahydroanthracen-5-yl)-5-(methyl)phenyl)-(4-methyl-2-phenoxymethyl)-trans-1,2-cyclohexanediylzirconium (IV) dichloride,
bis((2-oxoyl-3-(1,2,3,4,6,7,8,9-octahydroanthracen-5-yl)-5-(methyl)phenyl)-(4-methyl-2-phenoxymethyl)-trans-1,2-cyclohexanediylzirconium (IV) dibenzyl,
bis((2-oxoyl-3-(dibenzo-1H-pyrrole-1-yl)-5-(methyl)phenyl)-(4-methyl-2-phenoxymethyl)-trans-1,2-cyclohexanediylzirconium (IV) dimethyl,
bis((2-oxoyl-3-(dibenzo-1H-pyrrole-1-yl)-5-(methyl)phenyl)-(4-methyl-2-phenoxymethyl)-trans-1,2-cyclohexanediylzirconium (IV) dichloride,
bis((2-oxoyl-3-(dibenzo-1H-pyrrole-1-yl)-5-(methyl)phenyl)-(4-methyl-2-phenoxymethyl)-trans-1,2-cyclohexanediylzirconium (IV) dibenzyl,
bis((2-oxoyl-3-(3,5-di-(1,1-dimethylethyl)phenyl)-5-(methyl)phenyl)-(4-methyl-2-phenoxymethyl)-trans-1,2-cyclohexanediylzirconium (IV) dimethyl,
bis((2-oxoyl-3-(3,5-di-(1,1-dimethylethyl)phenyl)-5-(methyl)phenyl)-(4-methyl-2-phenoxymethyl)-trans-1,2-cyclohexanediylzirconium (IV) dichloride,
bis((2-oxoyl-3-(3,5-di-(1,1-dimethylethyl)phenyl)-5-(methyl)phenyl)-(4-methyl-2-phenoxymethyl)-trans-1,2-cyclohexanediylzirconium (IV) dibenzyl,
bis((2-oxoyl-3-(1,2,3,4,6,7,8,9-octahydroanthracen-x-yl)-5-(methyl)phenyl)-(4-methyl-2-phenoxy))-cis-1,3-cyclohexanediylzirconium (IV) dimethyl,
bis((2-oxoyl-3-(1,2,3,4,6,7,8,9-octahydroanthracen-5-yl)-5-(methyl)phenyl)-(4-methyl-2-phenoxy))-cis-1,3-cyclohexanediylzirconium (IV) dichloride,
bis((2-oxoyl-3-(1,2,3,4,6,7,8,9-octahydroanthracen-5-yl)-5-(methyl)phenyl)-(4-methyl-2-phenoxy))-cis-1,3-cyclohexanediylzirconium (IV) dibenzyl,
bis((2-oxoyl-3-(dibenzo-1H-pyrrole-1-yl)-5-(methyl)phenyl)-(4-methyl-2-phenoxy))-cis-1,3-cyclohexanediylzirconium (IV) dimethyl,
bis((2-oxoyl-3-(dibenzo-1H-pyrrole-1-yl)-5-(methyl)phenyl)-(4-methyl-2-phenoxy))-cis-1,3-cyclohexanediylzirconium (IV) dichloride,
bis((2-oxoyl-3-(dibenzo-1H-pyrrole-1-yl)-5-(methyl)phenyl)-(4-methyl-2-phenoxy))-cis-1,3-cyclohexanediylzirconium (IV) dibenzyl,
bis((2-oxoyl-3-(3,5-di-(1,1-dimethylethyl)phenyl)-5-(methyl)phenyl)-(4-methyl-2-phenoxy))-cis-1,3-cyclohexanediylzirconium (IV) dimethyl,
bis((2-oxoyl-3-(3,5-di-(1,1-dimethylethyl)phenyl)-5-(methyl)phenyl)-(4-methyl-2-phenoxy))-cis-1,3-cyclohexanediylzirconium (IV) dichloride,
bis((2-oxoyl-3-(3,5-di-(1,1-dimethylethyl)phenyl)-5-(methyl)phenyl)-(4-methyl-2-phenoxy))-cis-1,3-cyclohexanediylzirconium (IV) dibenzyl,
bis((2-oxoyl-3-(1,2,3,4,6,7,8,9-octahydroanthracen-5-yl)-5-(methyl)phenyl)-(4-methyl-2-phenoxy))-cis-4,5-cyclohexenediylzirconium (IV) dimethyl,
bis((2-oxoyl-3-(1,2,3,4,6,7,8,9-octahydroanthracen-5-yl)-5-(methyl)phenyl)-(4-methyl-2-phenoxy))-cis-4,5-cyclohexenediylzirconium (IV) dichloride,
bis((2-oxoyl-3-(1,2,3,4,6,7,8,9-octahydroanthracen-5-yl)-5-(methyl)phenyl)-(4-methyl-2-phenoxy))-cis-4,5-cyclohexenediylzirconium (IV) dibenzyl,
bis((2-oxoyl-3-(dibenzo-1H-pyrrole-1-yl)-5-(methyl)phenyl)-(4-methyl-2-phenoxy))-cis-4,5-cyclohexenediylzirconium (IV) dimethyl,
bis((2-oxoyl-3-(dibenzo-1H-pyrrole-1-yl)-5-(methyl)phenyl)-(4-methyl-2-phenoxy))-cis-4,5-cyclohexenediylzirconium (IV) dichloride,
bis((2-oxoyl-3-(dibenzo-1H-pyrrole-1-yl)-5-(methyl)phenyl)-(4-methyl-2-phenoxy))-cis-4,5-cyclohexenediylzirconium (IV) dibenzyl,
bis((2-oxoyl-3-(3,5-di-(1,1-dimethylethyl)phenyl)-5-(methyl)phenyl)-(4-methyl-2-phenoxy))-cis-4,5-cyclohexenediylzirconium (IV) dimethyl,
bis((2-oxoyl-3-(3,5-di-(1,1-dimethylethyl)phenyl)-5-(methyl)phenyl)-(4-methyl-2-phenoxy))-cis-4,5-cyclohexenediylzirconium (IV) dichloride,
bis((2-oxoyl-3-(3,5-di-(1,1-dimethylethyl)phenyl)-5-(methyl)phenyl)-(4-methyl-2-phenoxy))-cis-4,5-cyclohexenediylzirconium (IV) dibenzyl,
C) bis((2-oxoyl-3-(1,2,3,4,6,7,8,9-octahydroanthracen-5-yl)-5-(methyl)phenyl)-(4-t-butyl-2-phenoxy)-1,3-propanediylzirconium (IV) dimethyl,
bis((2-oxoyl-3-(1,2,3,4,6,7,8,9-octahydroanthracen-5-yl)-5-(methyl)phenyl)-(4-t-butyl-2-phenoxy)-1,3-propanediylzirconium (IV) dichloride, bis((2-oxoyl-3-(1,2,3,4,6,7,8,9-octahydroanthracen-5-yl)-5-(n ethyl)phenyl)-(4-t-butyl-2-phenoxy)-1,3-propanediylzirconium (IV) dibenzyl,
bis((2-oxoyl-3-(dibenzo-1H-pyrrole-1-yl)-5-(methyl)phenyl)-(4-t-butyl-2-phenoxy)-1,3-propanediylzirconium (IV) dimethyl,
bis((2-oxoyl-3-(dibenzo-1H-pyrrole-1-yl)-5-(methyl)phenyl)-(4-t-butyl-2-phenoxy)-1,3-propanediylzirconium (IV) dichloride,
bis((2-oxoyl-3-(dibenzo-1H-pyrrole-1-yl)-5-(methyl)phenyl)-(4-t-butyl-2-phenoxy)-1,3-propanediylzirconium (IV) dibenzyl,
bis((2-oxoyl-3-(3,5-di-(1,1-dimethylethyl)phenyl)-5-(methyl)phenyl)-(4-t-butyl-2-phenoxy)-1,3-propanediylzirconium (IV) dimethyl,
bis((2-oxoyl-3-(3,5-di-(1,1-dimethylethyl)phenyl)-5-(methyl)phenyl)-(4-t-butyl-2-phenoxy)-1,3-propanediylzirconium (IV) dichloride,
bis((2-oxoyl-3-(3,5-di-(1,1-dimethylethyl)phenyl)-5-(methyl)phenyl)-(4-t-butyl-2-phenoxy)-1,3-propanediylzirconium (IV) dibenzyl,
bis((2-oxoyl-3-(1,2,3,4,6,7,8,9-octahydroanthracen-5-yl)-5-(methyl)phenyl)-(4-t-butyl-2-phenoxymethyl)-trans-1,2-cyclohexanediylzirconium (IV) dimethyl,
bis((2-oxoyl-3-(1,2,3,4,6,7,8,9-octahydroanthracen-5-yl)-5-(methyl)phenyl)-(4-t-butyl-2-phenoxymethyl)-trans-1,2-cyclohexanediylzirconium (IV) dichloride,
bis((2-oxoyl-3-(1,2,3,4,6,7,8,9-octahydroanthracen-5-yl)-5-(methyl)phenyl)-(4-t-butyl-2-phenoxymethyl)-trans-1,2-cyclohexanediylzirconium (IV) dibenzyl,
bis((2-oxoyl-3-(dibenzo-1H-pyrrole-1-yl)-5-(methyl)phenyl)-(4-t-butyl-2-phenoxymethyl)-trans-1,2-cyclohexanediylzirconium (IV) dimethyl,
bis((2-oxoyl-3-(dibenzo-1H-pyrrole-1-yl)-5-(methyl)phenyl)-(4-t-butyl-2-phenoxymethyl)-trans-1,2-cyclohexanediylzirconium (IV) dichloride,
bis((2-oxoyl-3-(dibenzo-1H-pyrrole-1-yl)-5-(methyl)phenyl)-(4-t-butyl-2-phenoxymethyl)-trans-1,2-cyclohexanediylzirconium (fV) dibenzyl
bis((2-oxoyl-3-(3,5-di-(1,1-dimethylethyl)phenyl)-5-(methyl)phenyl)-(4-t-butyl-2-phenoxymethyl)-trans-1,2-cyclohexanediylzirconium (IV) dimethyl,
bis((2-oxoyl-3v-5-(methyl)phenyl)-(4-t-butyl-2-phenoxymethyl)-trans-1,2-cyclohexanediylzirconium (IV) dichloride,
bis((2-oxoyl-3-(3,5-di-(1,1-dimethylethyl)phenyl)-5-(methyl)phenyl)-(4-t-butyl-2-phenoxymethyl)-trans-1,2-cyclohexanediylzirconium (IV) dibenzyl,
bis((2-oxoyl-3-(1,2,3,4,6,7,8,9-octahydroanthracen-5-yl)-5-(methyl)phenyl)-(4-t-butyl-2-phenoxy))-cis-1,3-cyclohexanediylzirconium (IV) dimethyl,
bis((2-oxoyl-3-(1,2,3,4,6,7,8,9-octahydroanthracen-5-yl)-5-(methyl)phenyl)-(4-t-butyl-2-phenoxy))-cis-1,3-cyclohexanediylzirconium (IV) dichloride,
bis((2-oxoyl-3-(1,2,3,4,6,7,8,9-octahydroanthracen-5-yl)-5-(methyl)phenyl)-(4-t-butyl-2-phenoxy))-cis-1,3-cyclohexanediylzirconium (IV) dibenzyl
bis((2-oxoyl-3-(dibenzo-1H-pyrrole-1-yl)-5-(methyl)phenyl)-(4-t-butyl-2-phenoxy))-cis-1,3-cyclohexanediylzirconium (IV) dimethyl,
bis((2-oxoyl-3-(dibenzo-1H-pyrrole-1-yl)-5-(methyl)phenyl)-(4-t-butyl-2-phenoxy))-cis-1,3-cyclohexanediylzirconium (IV) dichloride,
bis((2-oxoyl-3-(dibenzo-1H-pyrrole-1-yl)-5-(methyl)phenyl)-(4-t-butyl-2-phenoxy))-cis-1,3-cyclohexanediylzirconium (IV) dibenzyl,
bis((2-oxoyl-3-(3,5-di-(1,1-dimethylethyl)phenyl)-5-(methyl)phenyl)-(4-t-butyl-2-phenoxy))-cis-1,3-cyclohexanediylzirconium (IV) dimethyl,
bis((2-oxoyl-3-(3,5-di-(1,1-dimethylethyl)phenyl)-5-(methyl)phenyl)-(4-t-butyl-2-phenoxy))-cis-1,3-cyclohexanediylzirconium (IV) dichloride,
bis((2-oxoyl-3-(3,5-di-(1,1-dimethylethyl)phenyl)-5-(methyl)phenyl)-(4-t-butyl-2-phenoxy))-cis-1,3-cyclohexanediylzirconium (IV) dibenzyl
bis((2-oxoyl-3-(1,2,3,4,6,7,8,9-octahydroanthracen-5-yl)-5-(methyl)phenyl)-(4-t-butyl-2-phenoxy))-cis-4,5-cyclohexenediylzirconium (IV) dimethyl,
bis((2-oxoyl-3-(1,2,3,4,6,7,8,9-octahydroanthracen-5-yl)-5-(methyl)phenyl)-(4-t-butyl-2-phenoxy))-cis-4,5-cyclohexenediylzirconium (IV) dichloride,
bis((2-oxoyl-3-(1,2,3,4,6,7,8,9-octahydroanthracen-5-yl)-5-(methyl)phenyl)-(4-t-butyl-2-phenoxy))-cis-4,5-cyclohexenediylzirconium (IV) dibenzyl,
bis((2-oxoyl-3-(dibenzo-1H-pyrrole-1-yl)-5-(methyl)phenyl)-(4-t-butyl-2-phenoxy))-cis-4,5-cyclohexenediylzirconium (IV) dimethyl,
bis((2-oxoyl-3-(dibenzo-1H-pyrrole-1-yl)-5-(methyl)phenyl)-(4-t-butyl-2-phenoxy))-cis-4,5-cyclohexenediylzirconium (IV) dichloride,
bis((2-oxoyl-3-(dibenzo-1H-pyrrole-1-yl)-5-(methyl)phenyl)-(4-t-butyl-2-phenoxy))-cis-4,5-cyclohexenediylzirconium (IV) dibenzyl,
bis((2-oxoyl-3-(3,5-di-(1,1-dimethylethyl)phenyl)-5-(methyl)phenyl)-(4-t-butyl-2-phenoxy))-cis-4,5-cyclohexenediylzirconium (IV) dimethyl,
bis((2-oxoyl-3-(3,5-di-(1,1-dimethylethyl)phenyl)-5-(methyl)phenyl)-(4-t-butyl-2-phenoxy))-cis-4,5-cyclohexenediylzirconium (IV) dichloride, and
bis((2-oxoyl-3-(3,5-di-(1,1-dimethylethyl)phenyl)-5-(methyl)phenyl)-(4-t-butyl-2-phenoxy))-cis-4,5-cyclohexenediylzirconium (IV) dibenzyl.

The foregoing metal complexes may be conveniently prepared by standard metallation and ligand exchange procedures involving a source of the transition metal and a neutral polyfunctional ligand source. In addition, the complexes may also be prepared by means of an amide elimination and hydrocarbylation process starting from the corresponding transition metal tetraamide and a hydrocarbylating agent, such as trimethylaluminum. The techniques employed are the same as or analogous to those disclosed in U.S. Pat. Nos. 6,320,005, 6,103,657, WO 02/38628, WO 03/40195, US-A-2004/0220050, and elsewhere.

The metal complex is activated to form the active catalyst composition by combination with the cocatalyst. The activation may occur prior to addition of the catalyst composition to the reactor with or without the presence of other components of the reaction mixture, or in situ through separate addition of the metal complex and activating cocatalyst to the reactor.

Monomers

Suitable olefin mixtures for use herein include mixtures of ethylene with one or more $C_{3-30}$ aliphatic-, cycloaliphatic- or aromatic-compounds (comonomers) containing one or more ethylenic unsaturations. Examples include aliphatic-, cycloaliphatic- and aromatic olefins or diolefins. Preferred comonomers include, but are not limited to, propylene, isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, vinylcyclohexane, styrene, cyclopentene, cyclohexene, cyclooctene, 1,3-butadiene, 1,3-pentadiene, 1,4-hexadiene, 1,5-hexadiene, 1,7-octadiene, 1,9-decadiene, 4-vinylcyclohexene, dicyclopentadiene, norbornadiene, ethylidenenorbornene, and mixtures thereof.

The novel processes described herein are well suited for the production of olefin polymers comprising monovinylidene aromatic monomers including styrene, o-methyl styrene, p-methyl styrene, t-butylstyrene, and mixtures thereof. In particular, interpolymers comprising ethylene and styrene can be advantageously prepared by following the teachings herein. Optionally, copolymers comprising ethylene, styrene and/or a $C_{3-20}$ alpha olefin, and further optionally comprising a conjugated or non-conjugated $C_{4-20}$ diene can be prepared.

Suitable non-conjugated dienes include straight chain-, branched chain- or cyclic-hydrocarbon dienes having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The most especially preferred diene is 5-ethylidene-2-norbornene (ENB).

In general, the polymerization may be accomplished at conditions well known in the prior art for olefin solution polymerization reactions. Preferred polymerization temperatures are dependent upon the comonomer content of the resulting polymer. For polymers of densities ranging from 0.865 to 0.885 g/cc, the preferred temperatures range from 130-250° C., more preferably from 150-220° C. For polymers of densities ranging from 0.885 to 0.940 g/cc, the preferred temperatures range from 170-250° C., more preferably from 180-250° C. Preferred polymerization pressures are from atmospheric to 3000 atmospheres (100 kPa to 300 MPa), more preferably from 1 MPa to 10 MPa. In most polymerization reactions the molar ratio of catalyst:polymerizable compound employed is from $10^{-12}$:1 to $10^{-1}$:1, more preferably from $10^{-11}$:1 to $10^{-5}$:1. Highly desirably, the reaction is conducted under continuous, solution polymerization conditions, that is, conditions wherein the monomer or monomers are continuously added to a reactor operating under solution polymerization conditions, and polymerized product is continuously or semi-continuously removed and recovered or forwarded to a second reactor.

Desirably, the polymerization mixture comprises an aliphatic or alicyclic liquid diluent. Examples of such aliphatic or alicyclic liquid diluents include straight and branched-chain hydrocarbons such as isobutane, butane, pentane, hexane, heptane, octane, and mixtures thereof; alicyclic hydrocarbons such as cyclohexane, cycloheptane, methylcyclohexane, methylcycloheptane, and mixtures thereof; and perfluorinated hydrocarbons such as perfluorinated $C_{4-10}$ alkanes, and the like. Small quantities of aromatic hydrocarbons such as toluene, ethylbenzene or xylene may be included as well, but are not preferred. Mixtures of the foregoing are also suitable. A preferred liquid diluent is a hydrogenated oligomeric aliphatic hydrocarbon mixture having a distillation, ASTM D 86, IBP of 118° C., distillation, ASTM D 86, Dry Point of 137° C., and Specific Gravity, 15.6° C., ASTM D 1250 of 0.72 sold commercially under the trade designation Isopar™ E, available from ExxonMobil Corporation.

The use of molecular weight control agents or chain transfer agents in the present process is desired. Examples of such molecular weight control agents include hydrogen, trialkyl aluminum compounds, or other known chain transfer agents. Hydrogen is a most preferred molecular weight control agent or chain transfer agent. A particular benefit of the use of the present invention is the ability (depending on reaction conditions) to produce narrow molecular weight distribution ethylene/α-olefin interpolymers. Preferred polymers have Mw/Mn of less than 3.0, more preferably less than 2.6. Such narrow molecular weight distribution polymer products are highly desirable due to improved tensile strength properties as well as reduced levels of extractables and metal values.

Without limiting in any way the scope of the invention, one means for carrying out the present polymerization process is as follows. In a stirred-tank reactor, the monomers to be polymerized are introduced continuously together with any solvent or diluent. The reactor contains a liquid phase composed substantially of monomers together with any solvent or diluent and dissolved polymer. Catalyst along with cocatalyst and optionally chain transfer agent are continuously or intermittently introduced in the reactor liquid phase or any recycled portion thereof. The reactor temperature may be controlled by adjusting the solvent/monomer ratio, the catalyst addition rate, as well as by use of cooling or heating coils, jackets or both. The polymerization rate is controlled by the rate of catalyst addition. Pressure is controlled by the monomer flow rate and partial pressures of volatile components. The ethylene content of the polymer product is determined by the ratio of ethylene to comonomer in the reactor, which is controlled by manipulating the respective feed rates of these components to the reactor. The polymer product molecular weight is controlled, optionally, by controlling other polymerization variables such as the temperature, monomer concentration, or by the flow rate of the previously mentioned chain transfer agent. Upon exiting the reactor, the effluent is contacted with a catalyst kill agent such as water, steam or an alcohol. The polymer solution is optionally heated, and the polymer product is recovered by flashing off gaseous monomers as well as residual solvent or diluent at reduced pressure, and, if necessary, conducting further devolatilization in equipment such as a devolatilizing extruder. In a continuous process, the mean residence time of the catalyst and polymer in the reactor generally is from 5 minutes to 8 hours, and preferably from 10 minutes to 6 hours.

Alternatively, the foregoing polymerization may be carried out in a continuous loop reactor with or without a monomer, comonomer, catalyst or cocatalyst gradient established between differing regions thereof, optionally accompanied by separate addition of catalysts and/or chain transfer agent, and operating under adiabatic or non-adiabatic solution polymerization conditions or combinations of the foregoing reactor conditions. Examples of suitable loop reactors and a variety of suitable operating conditions for use therewith are found in U.S. Pat. Nos. 5,977,251, 6,319,989 and 6,683,149.

Specific Embodiments

The following embodiments are provided for purposes of specific disclosure for the appended claims.

1. A process for polymerization of ethylene and one or more $C_{3-30}$ α-olefins or diolefins under continuous, solution polymerization conditions to prepare a high molecular weight polymer, said process comprising conducting the polymerization in the presence of a catalyst composition comprising a zirconium complex of a polyvalent aryloxyether corresponding to the formula:

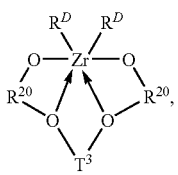

where:

$R^{20}$ independently each occurrence is a divalent aromatic or inertly substituted aromatic group containing from 5 to 20 atoms not counting hydrogen;

$T^3$ is a divalent hydrocarbon or silane group having from 1 to 20 atoms not counting hydrogen, or an inertly substituted derivative thereof; and $R^D$ independently each occurrence is a monovalent ligand group of from 1 to 20 atoms, not counting hydrogen, or two $R^D$ groups together are a divalent ligand group of from 1 to 40 atoms, not counting hydrogen;

and an alumoxane activating cocatalyst in a molar quantity based on zirconium from 10:1 to 200:1 under conditions that result in formation of a copolymer having low residual cocatalyst content.

2. The process of embodiment 1 wherein the resulting polymer has a molecular weight distribution, Mw/Mn, less than 3.0.

3. The process of embodiment 1 wherein the catalyst composition additionally comprises a chain transfer agent.

4. The process of embodiment 3 wherein the quantity of chain transfer agent present in the reactor is sufficient to decrease the Mw of the resulting polymer at least 30 percent compared to the molecular weight of the resulting polymer prepared in the absence of a chain transfer agent.

5. The process of embodiment 3 wherein the chain transfer agent is hydrogen, present in an amount from 0.015 to 2.0 mol percent (based on ethylene).

6. The process of embodiment 1 wherein the ethylene conversion is at least 85 mol percent.

7. The process of any one of embodiments 1-6 wherein a monomer mixture consisting essentially of ethylene and one or more $C_{3-20}$ α-olefins is polymerized.

8. The process of embodiment 7 wherein a monomer mixture consisting essentially of ethylene and one or more $C_{6-20}$ α-olefins is polymerized.

9. The process of embodiment 1 conducted at a temperature from 180 to 250° C. in the presence of a chain transfer agent to prepare a polymer having a density between 0.885 and 0.950 g/cm$^3$, a melt index, $I_2$, <5.0, a molecular weight distribution Mw/Mn<3.0, and a catalyst efficiency of greater than 0.5 $g_{polymer}/\mu g_{metal}$.

10. The process of embodiment 9 wherein the chain transfer agent is present in a quantity such that the decrease in Mw of the resulting polymer is >30 percent compared to the Mw of the resulting polymer made in the absence of chain transfer agent.

11. The process of embodiment 10 wherein the chain transfer agent is hydrogen present in the reactor in an amount of from 0.015 to 2 mol percent based on ethylene.

12. The process of any one of embodiments 9-11 wherein a monomer mixture consisting essentially of ethylene and one or more $C_{3-20}$ α-olefins is polymerized.

13. The process of embodiment 12 wherein a monomer mixture consisting essentially of ethylene and one or more $C_{6-20}$ α-olefins is polymerized.

14. The process of embodiment 1 conducted at a temperature from 150 to 250° C. in the presence of a chain transfer agent to prepare a polymer having a density between 0.885 and 0.950 g/cm$^3$, a melt index, $I_2$, <5.0, a molecular weight distribution Mw/Mn<3.0, and a catalyst efficiency of greater than 0.5 $g_{polymer}/\mu g_{metal}$.

15. The process of embodiment 14 wherein the chain transfer agent is present in a quantity such that the decrease in Mw of the resulting polymer is >30 percent compared to the Mw of the resulting polymer made in the absence of chain transfer agent.

16. The process of embodiment 15 wherein the chain transfer agent is hydrogen present in the reactor in an amount of from 0.015 to 2 mol percent based on ethylene.

17. The process of any one of embodiments 14-16 wherein a monomer mixture consisting essentially of ethylene and one or more $C_{3-20}$ α-olefins is polymerized.

18. The process of embodiment 17 wherein a monomer mixture consisting essentially of ethylene and one or more $C_{6-20}$ α-olefins is polymerized.

19. The process of embodiment 1 conducted at a temperature from 130 to 250° C. and an ethylene conversion of at least 80 mol percent, in the presence of a chain transfer agent to prepare a polymer having a density between 0.865 and 0.950 g/cm$^3$, a melt index, 12, from 0.01 to 100, a molecular weight distribution Mw/Mn<3.0, and a dissipation factor at 130° C. of less than 1 percent, preferably less than 0.5 percent and even more preferably less than 0.25 percent.

20. The process of embodiment 19 wherein the alumoxane is present in an amount to provide a molar ratio based on Zr from 20:1 to 150:1.

21. The process of embodiment 20 wherein the alumoxane is present in an amount to provide a molar ratio based on Zr from 20:1 to 80:1.

22. The process of any one of embodiments 19-21 wherein the alumoxane is tri(isobutyl)aluminum modified methalumoxane or tri(n-octyl)aluminum modified methalumoxane.

23. The process of embodiment 22 wherein the tri(isobutyl)aluminum modified methalumoxane contains from 10 to 30 mole percent i-butyl content and the tri(n-octyl)aluminum modified methalumoxane contains from 10 to 20 mole percent n-octyl content, said molar percents being based on total alkyl ligand content in the alumoxane.

24. The process of embodiment 23 wherein the tri(isobutyl)aluminum modified methalumoxane contains from 15 to 25 mole percent i-butyl content and the tri(n-octyl)aluminum modified methalumoxane contains from 12 to 18 mole percent n-octyl content, said molar percents being based on total alkyl ligand content in the alumoxane.

25. The process of any one of embodiments 19-24 wherein the chain transfer agent is present in a quantity such that the decrease in Mw of the resulting polymer is >30 percent compared to the Mw of the resulting polymer made in the absence of chain transfer agent.

26. The process of embodiment 25 wherein the chain transfer agent is hydrogen present in the reactor in an amount of from 0.015 to 2 mol percent based on ethylene.

27. The process of any one of embodiments 1-6 conducted in a single reactor and the catalyst composition additionally comprises at least one other metal complex or compound.

28. The process of any one of embodiments 1-6 conducted in at least one reactor of two or more reactors connected in series or in parallel.

29. The process of embodiment 28 wherein the catalyst composition employed in at least one reactor comprises at least one other metal complex.

30. A process according to any one of embodiments 1-6 wherein the metal complex corresponds to the formula:

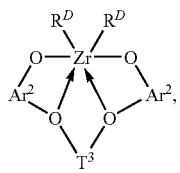

wherein:

$Ar^2$ independently each occurrence is an arylene or an alkyl-, aryl-, alkoxy- or amino-substituted arylene group of from 6 to 20 atoms not counting hydrogen or any atoms of any substituent;

$T^3$ is a divalent hydrocarbon bridging group of from 2 to 20 atoms not counting hydrogen, preferably a divalent substituted or unsubstituted $C_{3-6}$ aliphatic, cycloaliphatic, or bis(alkylene)-substituted cycloaliphatic group; and $R^D$ independently each occurrence is a monovalent ligand group of from 1 to 20 atoms, not counting hydrogen, or two $R^D$ groups together are a divalent ligand group of from 1 to 40 atoms, not counting hydrogen.

31. The process of embodiment 30 wherein the metal complex corresponds to the formula:

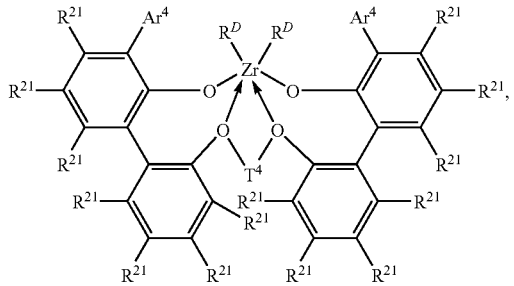

where $Ar^4$ independently each occurrence is $C_{6-20}$ aryl or inertly substituted derivatives thereof, especially 3,5-di(isopropyl)phenyl, 3,5-di(isobutyl)phenyl, dibenzo-1H-pyrrole-1-yl, naphthyl, anthracen-5-yl, 1,2,3,4,6,7,8,9-octahydroanthracen-5-yl;

$T^4$ independently each occurrence is a propylene-1,3-diyl group, a cyclohexan-1,2-diyl group, a bis(alkylene)cyclohexan-1,2-diyl group, a cyclohexen-4,5-diyl group, or an inertly substituted derivative thereof;

$R^{21}$ independently each occurrence is hydrogen, halo, hydrocarbyl, trihydrocarbylsilyl, trihydrocarbylsilylhydrocarbyl, alkoxy or amino of up to 50 atoms not counting hydrogen; and $R^D$, independently each occurrence is halo or a hydrocarbyl or trihydrocarbylsilyl group of up to 20 atoms not counting hydrogen, or 2 $R^D$ groups together are a divalent hydrocarbylene, hydrocarbadiyl or trihydrocarbylsilyl group of up to 40 atoms not counting hydrogen.

32. The process of embodiment 31 wherein the metal complex corresponds to the formula:

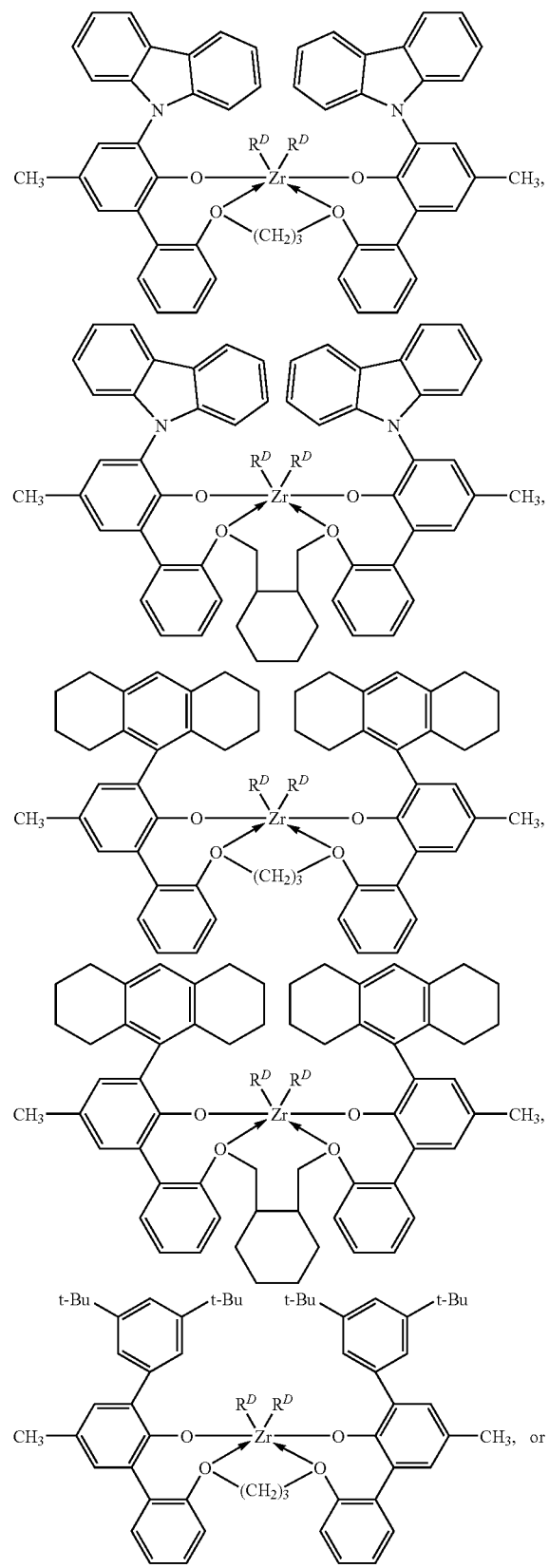

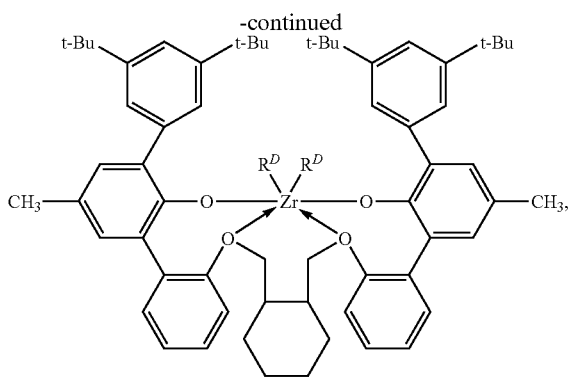

wherein, $R^D$ independently each occurrence is chloro, methyl or benzyl.

33. The process of embodiment 32 wherein the metal complex is selected from the group consisting of:
A) bis((2-oxoyl-3-(1,2,3,4,6,7,8,9-octahydroanthracen-5-yl)-5-(methyl)phenyl)-2-phenoxy)-1,3-propanediylzirconium (IV) dimethyl,
bis((2-oxoyl-3-(1,2,3,4,6,7,8,9-octahydroanthracen-5-yl)-5-(methyl)phenyl)-2-phenoxy)-1,3-propanediylzirconium (IV) dichloride,
bis((2-oxoyl-3-(1,2,3,4,6,7,8,9-octahydroanthracen-5-yl)-5-(methyl)phenyl)-2-phenoxy)-1,3-propanediylzirconium (IV) dibenzyl,
bis((2-oxoyl-3-(dibenzo-1H-pyrrole-1-yl)-5-(methyl)phenyl)-2-phenoxy)-1,3-propanediylzirconium (IV) dimethyl,
bis((2-oxoyl-3-(dibenzo-1H-pyrrole-1-yl)-5-(methyl)phenyl)-2-phenoxy)-1,3-propanediylzirconium (IV) dichloride,
bis((2-oxoyl-3-(dibenzo-1H-pyrrole-1-yl)-5-(methyl)phenyl)-2-phenoxy)-1,3-propanediylzirconium (IV) dibenzyl,
bis((2-oxoyl-3-(3,5-di-(1,1-dimethylethyl)phenyl)-5-(methyl)phenyl)-2-phenoxy)-1,3-propanediylzirconium (IV) dimethyl,
bis((2-oxoyl-3-(3,5-di-(1,1-dimethylethyl)phenyl)-5-(methyl)phenyl)-2-phenoxy)-1,3-propanediylzirconium (IV) dichloride,
bis((2-oxoyl-3-(3,5-di-(1,1-dimethylethyl)phenyl)-5-(methyl)phenyl)-2-phenoxy)-1,3-propanediylzirconium (IV) dibenzyl,
bis((2-oxoyl-3-(1,2,3,4,6,7,8,9-octahydroanthracen-5-yl)-5-(methyl)phenyl)-2-phenoxymethyl)-trans-1,2-cyclohexanediylzirconium (IV) dimethyl,
bis((2-oxoyl-3-(1,2,3,4,6,7,8,9-octahydroanthracen-5-yl)-5-(methyl)phenyl)-2-phenoxymethyl)-trans-1,2-cyclohexanediylzirconium (IV) dichloride,
bis((2-oxoyl-3-(1,2,3,4,6,7,8,9-octahydroanthracen-5-yl)-5-(methyl)phenyl)-2-phenoxymethyl)-trans-1,2-cyclohexanediylzirconium (IV) dibenzyl,
bis((2-oxoyl-3-(dibenzo-1H-pyrrole-1-yl)-5-(methyl)phenyl)-2-phenoxymethyl)-trans-1,2-cyclohexanediylzirconium (IV) dimethyl,
bis((2-oxoyl-3-(dibenzo-1H-pyrrole-1-yl)-5-(methyl)phenyl)-2-phenoxymethyl)-trans-1,2-cyclohexanediylzirconium (IV) dichloride,
bis((2-oxoyl-3-(dibenzo-1H-pyrrole-1-yl)-5-(methyl)phenyl)-2-phenoxymethyl)-trans-1,2-cyclohexanediylzirconium (IV) dibenzyl,
bis((2-oxoyl-3-(3,5-di-(1,1-dimethylethyl)phenyl)-5-(methyl)phenyl)-2-phenoxymethyl)-trans-1,2-cyclohexanediylzirconium (IV) dimethyl,
bis((2-oxoyl-3-(3,5-di-(1,1-dimethylethyl)phenyl)-5-(methyl)phenyl)-2-phenoxymethyl)-trans-1,2-cyclohexanediylzirconium (IV) dichloride,
bis((2-oxoyl-3-(3,5-di-(1,1-dimethylethyl)phenyl)-5-(methyl)phenyl)-2-phenoxymethyl)-trans-1,2-cyclohexanediylzirconium (IV) dibenzyl,
bis((2-oxoyl-3-(1,2,3,4,6,7,8,9-octahydroanthracen-5-yl)-5-(methyl)phenyl)-2-phenoxy)-cis-1,3-cyclohexanediylzirconium (IV) dimethyl,
bis((2-oxoyl-3-(1,2,3,4,6,7,8,9-octahydroanthracen-5-yl)-5-(methyl)phenyl)-2-phenoxy)-cis-1,3-cyclohexanediylzirconium (IV) dichloride,
bis((2-oxoyl-3-(1,2,3,4,6,7,8,9-octahydroanthracen-5-yl)-5-(methyl)phenyl)-2-phenoxy)-cis-1,3-cyclohexanediylzirconium (IV) dibenzyl,
bis((2-oxoyl-3-(dibenzo-1H-pyrrole-1-yl)-5-(methyl)phenyl)-2-phenoxy)-cis-1,3-cyclohexanediylzirconium (IV) dimethyl,
bis((2-oxoyl-3-(dibenzo-1H-pyrrole-1-yl)-5-(methyl)phenyl)-2-phenoxy)-cis-1,3-cyclohexanediylzirconium (IV) dichloride,
bis((2-oxoyl-3-(dibenzo-1H-pyrrole-1-yl)-5-(methyl)phenyl)-2-phenoxy)-cis-1,3-cyclohexanediylzirconium (IV) dibenzyl
bis((2-oxoyl-3v-5-(methyl)phenyl)-2-phenoxy)-cis-1,3-cyclohexanediylzirconium (IV) dimethyl,
bis((2-oxoyl-3-(3,5-di-(1,1-dimethylethyl)phenyl)-5-(methyl)phenyl)-2-phenoxy)-cis-1,3-cyclohexanediylzirconium (IV) dichloride,
bis((2-oxoyl-3-(3,5-di-(1,1-dimethylethyl)phenyl)-5-(methyl)phenyl)-2-phenoxy)-cis-1,3-cyclohexanediylzirconium (IV) dibenzyl,
bis((2-oxoyl-3-(1,2,3,4,6,7,8,9-octahydroanthracen-5-yl)-5-(methyl)phenyl)-2-phenoxy)-cis-4,5-cyclohexenediylzirconium (IV) dimethyl,
bis((2-oxoyl-3-(1,2,3,4,6,7,8,9-octahydroanthracen-5-yl)-5-(methyl)phenyl)-2-phenoxy)-cis-4,5-cyclohexenediylzirconium (IV) dichloride,
bis((2-oxoyl-3-(1,2,3,4,6,7,8,9-octahydroanthracen-5-yl)-5-(methyl)phenyl)-2-phenoxy)-cis-4,5-cyclohexenediylzirconium (IV) dibenzyl,
bis((2-oxoyl-3-(dibenzo-1H-pyrrole-1-yl)-5-(methyl)phenyl)-2-phenoxy)-cis-4,5-cyclohexenediylzirconium (IV) dimethyl,
bis((2-oxoyl-3-(dibenzo-1H-pyrrole-1-yl)-5-(methyl)phenyl)-2-phenoxy)-cis-4,5-cyclohexenediylzirconium (IV) dichloride,
bis((2-oxoyl-3-(dibenzo-1H-pyrrole-1-yl)-5-(methyl)phenyl)-2-phenoxy)-cis-4,5-cyclohexenediylzirconium (IV) dibenzyl
bis((2-oxoyl-3-(3,5-di-(1,1-dimethylethyl)phenyl)-5-(methyl)phenyl)-2-phenoxy)-cis-4,5-cyclohexenediylzirconium (IV) dimethyl,
bis((2-oxoyl-3-(3,5-di-(1,1-dimethylethyl)phenyl)-5-(methyl)phenyl)-2-phenoxy)-cis-4,5-cyclohexenediylzirconium (IV) dichloride,
bis((2-oxoyl-3-(3,5-di-(1,1-dimethylethyl)phenyl)-5-(methyl)phenyl)-2-phenoxy)-cis-4,5-cyclohexenediylzirconium (IV) dibenzyl,
B) bis((2-oxoyl-3-(1,2,3,4,6,7,8,9-octahydroanthracen-5-yl)-5-(methyl)phenyl)-(4-methyl-2-phenoxy)-1,3-propanediylzirconium (IV) dimethyl,
bis((2-oxoyl-3-(1,2,3,4,6,7,8,9-octahydroanthracen-5-yl)-5-(methyl)phenyl)-(4-methyl-2-phenoxy)-1,3-propanediylzirconium (IV) dichloride, bis((2-oxoyl-3-(1,2,3,4,6,7,8,9-octahydroanthracen-5-yl)-5-(methyl)phenyl)-(4-methyl-2-phenoxy)-1,3-propanediylzirconium (IV) dibenzyl,
bis((2-oxoyl-3-(dibenzo-1H-pyrrole-1-yl)-5-(methyl)phenyl)-(4-methyl-2-phenoxy)-1,3-propanediylzirconium (IV) dimethyl,
bis((2-oxoyl-3-(dibenzo-1H-pyrrole-1-yl)-5-(methyl)phenyl)-(4-methyl-2-phenoxy)-1,3-propanediylzirconium (IV) dichloride,
bis((2-oxoyl-3-(dibenzo-1H-pyrrole-1-yl)-5-(methyl)phenyl)-(4-methyl-2-phenoxy)-1,3-propanediylzirconium (IV) dibenzyl
bis((2-oxoyl-3-(3,5-di-(1,1-dimethylethyl)phenyl)-5-(methyl)phenyl)-(4-methyl-2-phenoxy)-1,3-propanediylzirconium (fV) dimethyl,
bis((2-oxoyl-3-(3,5-di-(1,1-dimethylethyl)phenyl)-5-(methyl)phenyl)-(4-methyl-2-phenoxy)-1,3-propanediylzirconium (IV) dichloride,
bis((2-oxoyl-3-(3,5-di-(1,1-dimethylethyl)phenyl)-5-(methyl)phenyl)-(4-methyl-2-phenoxy)-1,3-propanediylzirconium (IV) dibenzyl,
bis((2-oxoyl-3-(1,2,3,4,6,7,8,9-octahydroanthracen-5-yl)-5-(methyl)phenyl)-(4-methyl-2-phenoxymethyl)-trans-1,2-cyclohexanediylzirconium (IV) dimethyl,
bis((2-oxoyl-3-(1,2,3,4,6,7,8,9-octahydroanthracen-5-yl)-5-(methyl)phenyl)-(4-methyl-2-phenoxymethyl)-trans-1,2-cyclohexanediylzirconium (IV) dichloride,
bis((2-oxoyl-3-(1,2,3,4,6,7,8,9-octahydroanthracen-5-yl)-5-(methyl)phenyl)-(4-methyl-2-phenoxymethyl)-trans-1,2-cyclohexanediylzirconium (IV) dibenzyl,
bis((2-oxoyl-3-(dibenzo-1H-pyrrole-1-yl)-5-(methyl)phenyl)-(4-methyl-2-phenoxymethyl)-trans-1,2-cyclohexanediylzirconium (IV) dimethyl,
bis((2-oxoyl-3-(dibenzo-1H-pyrrole-1-yl)-5-(methyl)phenyl)-(4-methyl-2-phenoxymethyl)-trans-1,2-cyclohexanediylzirconium (IV) dichloride,
bis((2-oxoyl-3-(dibenzo-1H-pyrrole-1-yl)-5-(methyl)phenyl)-(4-methyl-2-phenoxymethyl)-trans-1,2-cyclohexanediylzirconium (IV) dibenzyl,
bis((2-oxoyl-3-(3,5-di-(1,1-dimethylethyl)phenyl)-5-(methyl)phenyl)-(4-methyl-2-phenoxymethyl)-trans-1,2-cyclohexanediylzirconium (IV) dimethyl,
bis((2-oxoyl-3-(3,5-di-(1,1-dimethylethyl)phenyl)-5-(methyl)phenyl)-(4-methyl-2-phenoxymethyl)-trans-1,2-cyclohexanediylzirconium (IV) dichloride,
bis((2-oxoyl-3-(3,5-di-(1,1-dimethylethyl)phenyl)-5-(methyl)phenyl)-(4-methyl-2-phenoxymethyl)-trans-1,2-cyclohexanediylzirconium (IV) dibenzyl,
bis((2-oxoyl-3-(1,2,3,4,6,7,8,9-octahydroanthracen-5-yl)-5-(methyl)phenyl)-(4-methyl-2-phenoxy))-cis-1,3-cyclohexanediylzirconium (IV) dimethyl,
bis((2-oxoyl-3-(1,2,3,4,6,7,8,9-octahydroanthracen-5-yl)-5-(methyl)phenyl)-(4-methyl-2-phenoxy))-cis-1,3-cyclohexanediylzirconium (IV) dichloride,
bis((2-oxoyl-3-(1,2,3,4,6,7,8,9-octahydroanthracen-5-yl)-5-(methyl)phenyl)-(4-methyl-2-phenoxy))-cis-1,3-cyclohexanediylzirconium (IV) dibenzyl,
bis((2-oxoyl-3-(dibenzo-1H-pyrrole-1-yl)-5-(methyl)phenyl)-(4-methyl-2-phenoxy))-cis-1,3-cyclohexanediylzirconium (IV) dimethyl,
bis((2-oxoyl-3-(dibenzo-1H-pyrrole-1-yl)-5-(methyl)phenyl)-(4-methyl-2-phenoxy))-cis-1,3-cyclohexanediylzirconium (IV) dichloride,
bis((2-oxoyl-3-(dibenzo-1H-pyrrole-1-yl)-5-(methyl)phenyl)-(4-methyl-2-phenoxy))-cis-1,3-cyclohexanediylzirconium (IV) dibenzyl,
bis((2-oxoyl-3-(3,5-di-(1,1-dimethylethyl)phenyl)-5-(methyl)phenyl)-(4-methyl-2-phenoxy))-cis-1,3-cyclohexanediylzirconium (IV) dimethyl,
bis((2-oxoyl-3-(3,5-di-(1,1-dimethylethyl)phenyl)-5-(methyl)phenyl)-(4-methyl-2-phenoxy))-cis-1,3-cyclohexanediylzirconium (IV) dichloride,
bis((2-oxoyl-3-(3,5-di-(1,1-dimethylethyl)phenyl)-5-(methyl)phenyl)-(4-methyl-2-phenoxy))-cis-1,3-cyclohexanediylzirconium (IV) dibenzyl,
bis((2-oxoyl-3-(1,2,3,4,6,7,8,9-octahydroanthracen-5-yl)-5-(methyl)phenyl)-(4-methyl-2-phenoxy))-cis-4,5-cyclohexenediylzirconium (IV) dimethyl,
bis((2-oxoyl-3-(1,2,3,4,6,7,8,9-octahydroanthracen-5-yl)-5-(methyl)phenyl)-(4-methyl-2-phenoxy))-cis-4,5-cyclohexenediylzirconium (IV) dichloride,
bis((2-oxoyl-3-(1,2,3,4,6,7,8,9-octahydroanthracen-5-yl)-5-(methyl)phenyl)-(4-methyl-2-phenoxy))-cis-4,5-cyclohexenediylzirconium (IV) dibenzyl,
bis((2-oxoyl-3-(dibenzo-1H-pyrrole-1-yl)-5-(methyl)phenyl)-(4-methyl-2-phenoxy))-cis-4,5-cyclohexenediylzirconium (IV) dimethyl,
bis((2-oxoyl-3-(dibenzo-1H-pyrrole-1-yl)-5-(methyl)phenyl)-(4-methyl-2-phenoxy))-cis-4,5-cyclohexenediylzirconium (IV) dichloride,
bis((2-oxoyl-3-(dibenzo-1H-pyrrole-1-yl)-5-(methyl)phenyl)-(4-methyl-2-phenoxy))-cis-4,5-cyclohexenediylzirconium (IV) dibenzyl,
bis((2-oxoyl-3-(3,5-di-(1,1-dimethylethyl)phenyl)-5-(methyl)phenyl)-(4-methyl-2-phenoxy))-cis-4,5-cyclohexenediylzirconium (IV) dimethyl,
bis((2-oxoyl-3-(3,5-di-(1,1-dimethylethyl)phenyl)-5-(methyl)phenyl)-(4-methyl-2-phenoxy))-cis-4,5-cyclohexenediylzirconium (IV) dichloride,
bis((2-oxoyl-3-(3,5-di-(1,1-dimethylethyl)phenyl)-5-(methyl)phenyl)-(4-methyl-2-phenoxy))-cis-4,5-cyclohexenediylzirconium (IV) dibenzyl,
C) bis((2-oxoyl-3-(1,2,3,4,6,7,8,9-octahydroanthracen-5-yl)-5-(methyl)phenyl)-(4-t-butyl-2-phenoxy)-1,3-propanediylzirconium (IV) dimethyl,
bis((2-oxoyl-3-(1,2,3,4,6,7,8,9-octahydroanthracen-5-yl)-5-(methyl)phenyl)-(4-t-butyl-2-phenoxy)-1,3-propanediylzirconium (IV) dichloride,
bis((2-oxoyl-3-(1,2,3,4,6,7,8,9-octahydroanthracen-5-yl)-5-(methyl)phenyl)-(4-t-butyl-2-phenoxy)-1,3-propanediylzirconium (IV) dibenzyl,
bis((2-oxoyl-3-(dibenzo-1H-pyrrole-1-yl)-5-(methyl)phenyl)-(4-t-butyl-2-phenoxy)-1,3-propanediylzirconium (IV) dimethyl,
bis((2-oxoyl-3-(dibenzo-1H-pyrrole-1-yl)-5-(methyl)phenyl)-(4-t-butyl-2-phenoxy)-1,3-propanediylzirconium (IV) dichloride,
bis((2-oxoyl-3-(dibenzo-1H-pyrrole-1-yl)-5-(methyl)phenyl)-(4-t-butyl-2-phenoxy)-1,3-propanediylzirconium (IV) dibenzyl,
bis((2-oxoyl-3-(3,5-di-(1,1-dimethylethyl)phenyl)-5-(methyl)phenyl)-(4-t-butyl-2-phenoxy)-1,3-propanediylzirconium (IV) dimethyl,
bis((2-oxoyl-3-(3,5-di-(1,1-dimethylethyl)phenyl)-5-(methyl)phenyl)-(4-t-butyl-2-phenoxy)-1,3-propanediylzirconium (IV) dichloride,
bis((2-oxoyl-3-(3,5-di-(1,1-dimethylethyl)phenyl)-5-(methyl)phenyl)-(4-t-butyl-2-phenoxy)-1,3-propanediylzirconium (IV) dibenzyl,
bis((2-oxoyl-3-(1,2,3,4,6,7,8,9-octahydroanthracen-5-yl)-5-(methyl)phenyl)-(4-t-butyl-2-phenoxymethyl)-trans-1,2-cyclohexanediylzirconium (IV) dimethyl, bis((2-oxoyl-3-(1,2,3,4,6,7,8,9-octahydroanthracen-5-yl)-5-(methyl)phenyl)-(4-t-butyl-2-phenoxymethyl)-trans-1,2-cyclohexanediylzirconium (IV) dichloride,
bis((2-oxoyl-3-(1,2,3,4,6,7,8,9-octahydroanthracen-5-yl)-5-(methyl)phenyl)-(4-t-butyl-2-phenoxymethyl)trans-1,2-cyclohexanediylzirconium (IV) dibenzyl,
bis((2-oxoyl-3-(dibenzo-1H-pyrrole-1-yl)-5-(methyl)phenyl)-(4-t-butyl-2-phenoxymethyl)-trans-1,2-cyclohexanediylzirconium (IV) dimethyl,
bis((2-oxoyl-3-(dibenzo-1H-pyrrole-1-yl)-5-(methyl)phenyl)-(4-t-butyl-2-phenoxymethyl)-trans-1,2-cyclohexanediylzirconium (IV) dichloride,
bis((2-oxoyl-3-(dibenzo-1H-pyrrole-1-yl)-5-(methyl)phenyl)-(4-t-butyl-2-phenoxymethyl)-trans-1,2-cyclohexanediylzirconium (IV) dibenzyl
bis((2-oxoyl-3-(3,5-di-(1,1-dimethylethyl)phenyl)-5-(methyl)phenyl)-(4-t-butyl-2-phenoxymethyl)-trans-1,2-cyclohexanediylzirconium (IV) dimethyl,
bis((2-oxoyl-3v-5-(methyl)phenyl)-(4-t-butyl-2-phenoxymethyl)-trans-1,2-cyclohexanediylzirconium (IV) dichloride,
bis((2-oxoyl-3-(3,5-di-(1,1-dimethylethyl)phenyl)-5-(methyl)phenyl)-(4-t-butyl-2-phenoxymethyl)-trans-1,2-cyclohexanediylzirconium (IV) dibenzyl,
bis((2-oxoyl-3-(1,2,3,4,6,7,8,9-octahydroanthracen-5-yl)-5-(methyl)phenyl)-(4-t-butyl-2-phenoxy))-cis-1,3-cyclohexanediylzirconium (IV) dimethyl,
bis((2-oxoyl-3-(1,2,3,4,6,7,8,9-octahydroanthracen-5-yl)-5-(methyl)phenyl)-(4-t-butyl-2-phenoxy))-cis-1,3-cyclohexanediylzirconium (IV) dichloride,
bis((2-oxoyl-3-(1,2,3,4,6,7,8,9-octahydroanthracen-5-yl)-5-(methyl)phenyl)-(4-t-butyl-2-phenoxy))-cis-1,3-cyclohexanediylzirconium (IV) dibenzyl
bis((2-oxoyl-3-(dibenzo-1H-pyrrole-1-yl)-5-(methyl)phenyl)-(4-t-butyl-2-phenoxy))-cis-1,3-cyclohexanediylzirconium (IV) dimethyl,
bis((2-oxoyl-3-(dibenzo-1H-pyrrole-1-yl)-5-(methyl)phenyl)-(4-t-butyl-2-phenoxy))-cis-1,3-cyclohexanediylzirconium (IV) dichloride,
bis((2-oxoyl-3-(dibenzo-1H-pyrrole-1-yl)-5-(methyl)phenyl)-(4-t-butyl-2-phenoxy))-cis-1,3-cyclohexanediylzirconium (IV) dibenzyl,
bis((2-oxoyl-3-(3,5-di-(1,1-dimethylethyl)phenyl)-5-(methyl)phenyl)-(4-t-butyl-2-phenoxy))-cis-1,3-cyclohexanediylzirconium (IV) dimethyl,
bis((2-oxoyl-3-(3,5-di-(1,1-dimethylethyl)phenyl)-5-(methyl)phenyl)-(4-t-butyl-2-phenoxy))-cis-1,3-cyclohexanediylzirconium (IV) dichloride,
bis((2-oxoyl-3-(3,5-di-(1,1-dimethylethyl)phenyl)-5-(methyl)phenyl)-(4-t-butyl-2-phenoxy))-cis-1,3-cyclohexanediylzirconium (IV) dibenzyl
bis((2-oxoyl-3-(1,2,3,4,6,7,8,9-octahydroanthracen-5-yl)-5-(methyl)phenyl)-(4-t-butyl-2-phenoxy))-cis-4,5-cyclohexenediylzirconium (IV) dimethyl,
bis((2-oxoyl-3-(1,2,3,4,6,7,8,9-octahydroanthracen-5-yl)-5-(methyl)phenyl)-(4-t-butyl-2-phenoxy))-cis-4,5-cyclohexenediylzirconium (IV) dichloride,
bis((2-oxoyl-3-(1,2,3,4,6,7,8,9-octahydroanthracen-5-yl)-5-(methyl)phenyl)-(4-t-butyl-2-phenoxy))-cis-4,5-cyclohexenediylzirconium (IV) dibenzyl,
bis((2-oxoyl-3-(dibenzo-1H-pyrrole-1-yl)-5-(methyl)phenyl)-(4-t-butyl-2-phenoxy))-cis-4,5-cyclohexenediylzirconium (IV) dimethyl,
bis((2-oxoyl-3-(dibenzo-1H-pyrrole-1-yl)-5-(methyl)phenyl)-(4-t-butyl-2-phenoxy))-cis-4,5-cyclohexenediylzirconium (IV) dichloride,
bis((2-oxoyl-3-(dibenzo-1H-pyrrole-1-yl)-5-(methyl)phenyl)-(4-t-butyl-2-phenoxy))-cis-4,5-cyclohexenediylzirconium (IV) dibenzyl,
bis((2-oxoyl-3-(3,5-di-(1,1-dimethylethyl)phenyl)-5-(methyl)phenyl)-(4-t-butyl-2-phenoxy))-cis-4,5-cyclohexenediylzirconium (IV) dimethyl,
bis((2-oxoyl-3-(3,5-di-(1,1-dimethylethyl)phenyl)-5-(methyl)phenyl)-(4-t-butyl-2-phenoxy))-cis-4,5-cyclohexenediylzirconium (IV) dichloride, and
bis((2-oxoyl-3-(3,5-di-(1,1-dimethylethyl)phenyl)-5-(methyl)phenyl)-(4-t-butyl-2-phenoxy))-cis-4,5-cyclohexenediylzirconium (IV) dibenzyl.

It is understood that the present invention is operable in the absence of any component which has not been specifically disclosed and may be combined with any other suitable reaction or process in a multistep polymerization system design. The following examples are provided in order to further illustrate the invention and are not to be construed as limiting. Unless stated to the contrary, all parts and percentages are expressed on a weight basis.

EXAMPLES 1-10

Preparation of Metal Complex

The synthetic procedures of US-A-2004/0010103 were substantially repeated to prepare metal complexes A1-A10.

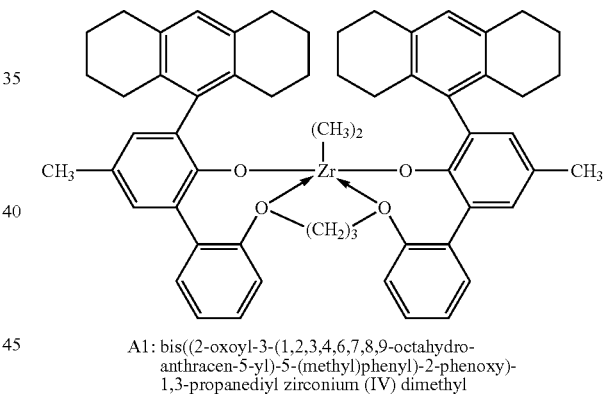

A1: bis((2-oxoyl-3-(1,2,3,4,6,7,8,9-octahydroanthracen-5-yl)-5-(methyl)phenyl)-2-phenoxy)-1,3-propanediyl zirconium (IV) dimethyl

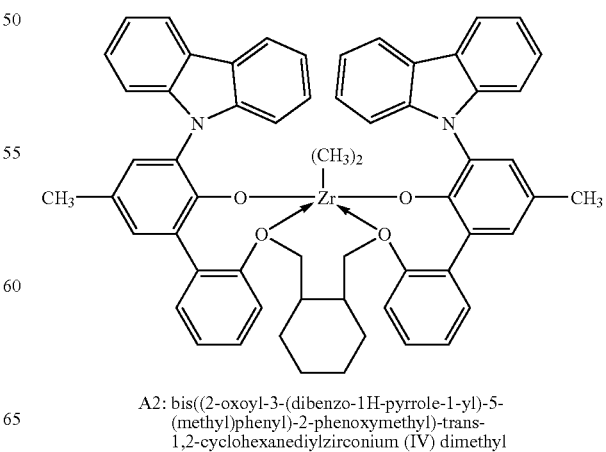

A2: bis((2-oxoyl-3-(dibenzo-1H-pyrrole-1-yl)-5-(methyl)phenyl)-2-phenoxymethyl)-trans-1,2-cyclohexanediylzirconium (IV) dimethyl

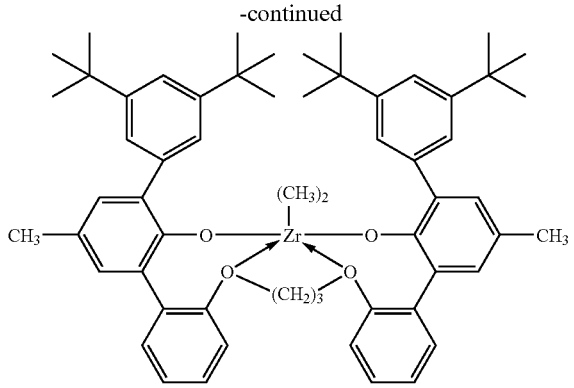

A3: bis((2-oxoyl-3-(3,5-bis-(1,1-dimethylethyl)
phenyl)-5-(methyl)phenyl)-2-phenoxy)-
1,3-propanediyl zirconium (IV) dimethyl

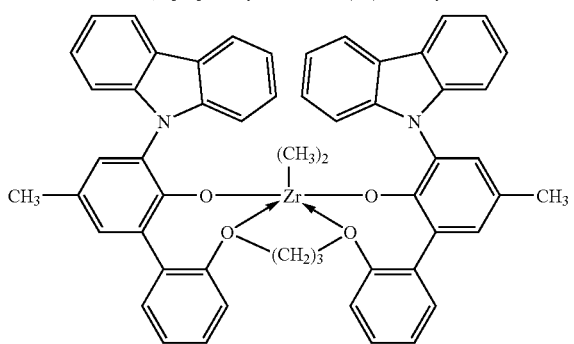

A4: bis((2-oxoyl-3-(dibenzo-1H-pyrrole-1-yl)-5-
(methyl)phenyl)-2-phenoxy)-
1,3-propanediyl zirconium (IV) dimethyl

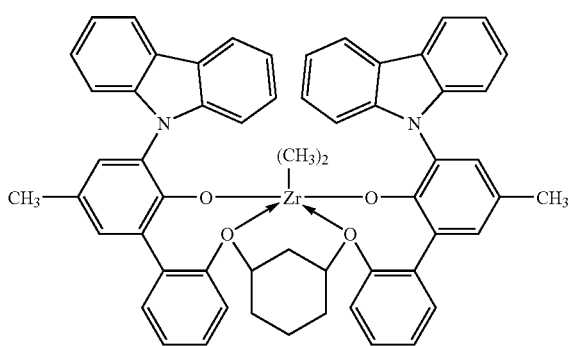

A5: bis((2-oxoyl-3-(dibenzo-1H-pyrrole-1-yl)-5-
(methyl)phenyl)-2-phenoxy)-cis-
1,3-cyclohexanediyl zirconium (IV) dimethyl

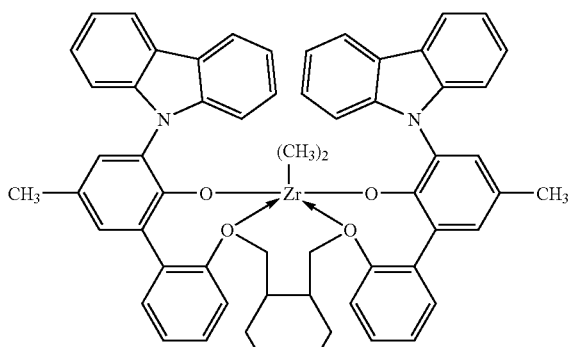

A6: bis((2-oxoyl-3-(dibenzo-1H-pyrrole-1-yl)-5-
(methyl)phenyl)-2-phenoxymethyl)-cis-
4,5-cyclohexenediyl zirconium (IV) dimethyl

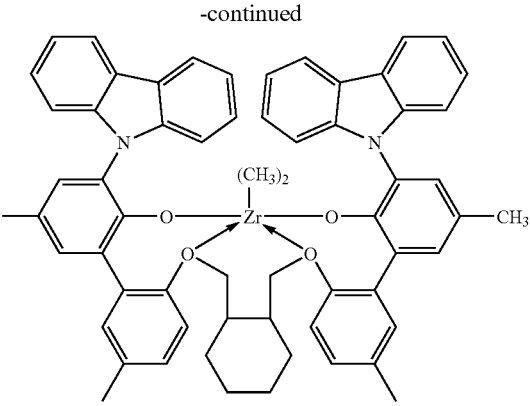

A7: bis((2-oxoyl-3-(dibenzo-1H-pyrrole-1-yl)-5-
(methyl)phenyl)-(4-methyl-2-phenoxymethyl)-
trans 1,2-cyclohexanezirconium (IV) dimethyl

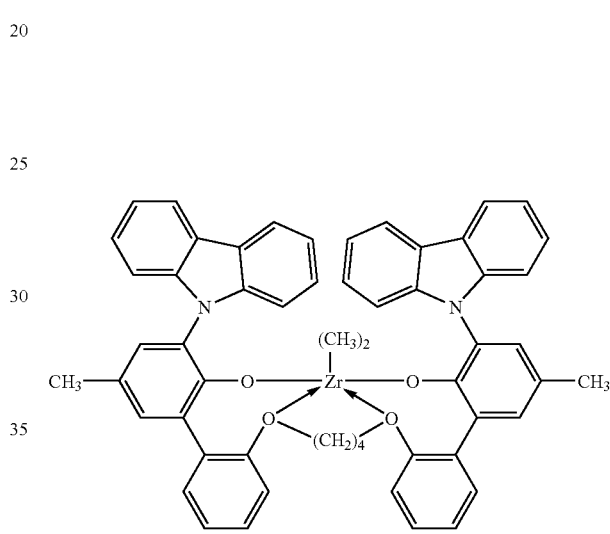

A8: bis((2-oxoyl-3-(dibenzo-1H-pyrrole-1-yl)-5-
(methyl)phenyl)-2-phenoxy)-
1,4-butanediylzirconium (IV) dimethyl

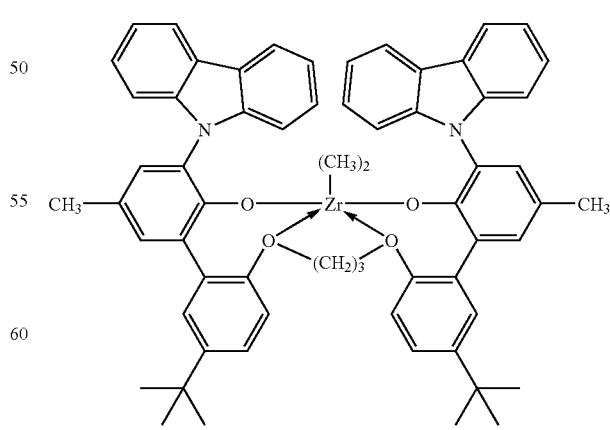

A9: bis((2-oxoyl-3-(dibenzo-1H-pyrrole-1-yl)-5-
(methyl)phenyl)-(4-(2-methyl)propane-2-yl)-2-
phenoxy)-1,3-propanediyl zirconium (IV) dimethyl

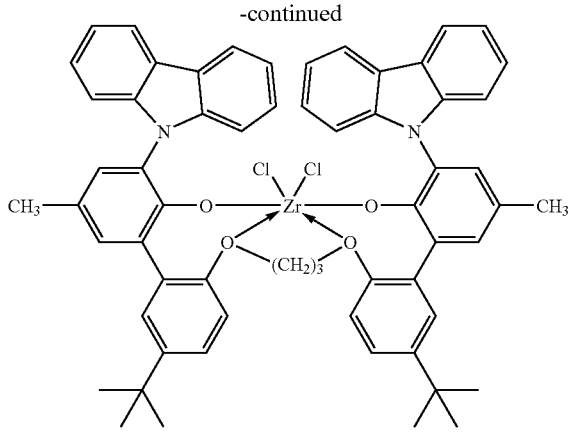

A10: bis((2-oxoyl-3-(dibenzo-1H-pyrrole-1-yl)-5-(methyl)phenyl)-(4-(2-methyl)propane-2-yl)-2-phenoxy)-1,3-propanediyl zirconium (IV) dichloride Cocatalyst The cocatalysts employed are tri(isobutyl)aluminum modified methalumoxane (MMAO) containing a molar ratio of i-butyl/methyl groups of about 1/3 (Run 1) tri(n-octyl) aluminum modified methalumoxane containing a molar ratio of n-octyl/methyl groups of about 1/6 (Runs 2-8), or 15 ppm based on Ti of tris(pentafluorophenyl)borane (Comparative A).

Continuous Solution Polymerization Conditions

Continuous solution polymerizations are carried out in a computer controlled autoclave reactor equipped with an internal stirrer. Purified mixed alkanes solvent (Isopar™ E available from ExxonMobil, Inc.), ethylene, 1-octene, and hydrogen are supplied to a 3.8 L reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst injection lines and the reactor agitator. These flows are measured by mass flow meters and controlled by control valves or by the manual adjustment of needle valves. The remaining solvent is combined with 1-octene, ethylene, and hydrogen and fed to the reactor. A mass flow controller is used to deliver hydrogen to the reactor as needed. The temperature of the solvent/monomer solution is controlled by use of a heat exchanger before entering the reactor. This stream enters the bottom of the reactor. The catalyst component solutions are metered using pumps and mass flow meters and are combined with the catalyst flush solvent and introduced into the bottom of the reactor. The reactor is run liquid-full at 500 psig (3.45 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated by passing through a heat exchanger before devolatilization. The polymer product is recovered by extrusion using a devolatilizing extruder and water cooled pelletizer.

Physical Property Testing

Dissipation factor measurements on polymers are measured according to ASTM test procedure D150 with test frequency set at 60 Hz, testing temperature set at 130° C., applied voltage set at 2 KV, and electrode distance set at 50 mil to test 2.5 inch (6.3 cm) diameter peroxide cured specimens. Prior to the testing, the plaque is placed in a vacuum oven at 60° C. for 1 week.

A cooled (−25° C.) sealed bottle of dicumyl peroxide is placed in a sealed polyethylene bag. The sealed bag is then placed in a water bath equilibrated to 55° C. for at least 4 hours. A glass jar containing pellets of the polymer to be tested is heated at 70° C. for at least 4 hours. The dicumyl peroxide is added to the heated polymer pellets with a warm syringe (pre-heated to 50-60° C.) to provide 1.9 weight percent peroxide. A nylon 6,6 film is placed between the jar and the lid to prevent absorption of the peroxide by the jar lid seal. The jar is sealed with the lid and placed on a tumbler operating at 30 rpm. After two minutes tumbling, the jar is removed and shaken to loosen the pellets from the sides of the jar and replaced on the tumbler for one more minute. After tumbling, the jar is placed back in the 70° C. oven for 5 minutes. This process is repeated until all the peroxide is absorbed. Upon complete absorption of peroxide, the jar is stored in the oven at 70° C. for an additional 16 hours.

Compression molded test plaques 0.050±0.005 inches (1.27 mm±0.12 mm) thick are prepared from the resin pellets. An aluminum foil lined mold is filled with the resin pellets. The press temperature is raised to 115° C.±5° C. for 5 minutes under low pressure. The mold pressure is increased (high pressure) for 3 minutes and the temperature increased to 175° C.±5° C. After reaching 175° C.±5° C. high pressure is maintained for 15 minutes to cure the plaque. The mold is cooled to 32° C.±5° C. while still under high pressure before removing the plaque.

Process details and results are contained in Tables 1 and 2. Runs 1-8 in Table 1 used A2 metal complex as catalyst. Comparative A is an ethylene/octene copolymer prepared using (t-butylamido)dimethyl(tetramethylcyclopentadienyl)silanetitanium dimethyl catalyst and trispentafluorophenylborane cocatalyst with MAO scavenger in a molar ratio Ti:B:Al of 1:3:1 (Engage™ polyolefin elastomer, available from The Dow Chemical Company). All runs in Table 2 used MMAO cocatalyst.

TABLE 1

| Run | Al Ratio | MI | $I_{10}/I_2$ | Density (g/cc) | Mw (×10$^3$) | Mw/Mn | Solvent Flow (kg/h) | $C_2H_4$ Flow (kg/h) | $C_8H_{16}$ Flow (kg/h) | $H_2$[1] (sccm) | $C_2H_4$[2] Conv. | T (° C.) | Eff.[3] | DF[4] |
|---|---|---|---|---|---|---|---|---|---|---|---|---|---|---|
| 1 | 97.8 | 0.96 | 14.2 | 0.919 | 73 | 2.26 | 12.3 | 1.8 | 0.4 | 93.5 | 92.1 | 190 | 3.11 | 0.13 |
| 2 | 50.6 | 0.97 | 13.7 | 0.919 | 73 | 2.26 | 12.3 | 1.8 | 0.4 | 94.0 | 92.1 | 190 | 6.77 | 0.76 |
| 3 | 50.0 | 1.97 | 12.4 | 0.920 | 63 | 2.24 | 12.3 | 1.8 | 0.4 | 103.0 | 92.2 | 190 | 6.96 | 0.16 |
| 4 | 50.7 | 4.80 | 10.5 | 0.920 | 57 | 2.31 | 12.2 | 1.8 | 0.4 | 119.6 | 92.7 | 190 | 7.07 | 0.14 |
| 5 | 50.1 | 4.95 | 11.6 | 0.869 | 77 | 2.57 | 10.8 | 1.2 | 1.7 | 9.9 | 91.5 | 170 | 4.45 | 0.17 |
| 6 | 50.8 | 2.03 | 13.4 | 0.870 | 89 | 2.62 | 10.9 | 1.2 | 1.6 | 6.5 | 91.9 | 170 | 4.77 | 0.08 |
| 7 | 50.7 | 0.91 | 14.9 | 0.870 | 102 | 2.75 | 10.9 | 1.2 | 1.6 | 3.6 | 92.1 | 170 | 4.89 | 0.06 |

TABLE 1-continued

| Run | Al Ratio | MI | $I_{10}/I_2$ | Density (g/cc) | Mw (×10³) | Mw/Mn | Solvent Flow (kg/h) | $C_2H_4$ Flow (kg/h) | $C_8H_{16}$ Flow (kg/h) | $H_2$[1] (sccm) | $C_2H_4$[2] Conv. | T (° C.) | Eff.[3] | DF[4] |
|---|---|---|---|---|---|---|---|---|---|---|---|---|---|---|
| 8 | 50.6 | 1.89 | 13.7 | 0.866 | 95 | 2.71 | 10.8 | 1.2 | 1.9 | 4.0 | 90.4 | 170 | 5.46 | 0.74 |
| A* | | 5.12 | 7.86 | 0.869 | | | | | | | | | | 2.95 |

*Comparative, not an example of the invention
[1] standard cm³/min
[2] percent ethylene conversion in reactor
[3] efficiency, g PE/μg Zr
[4] Dissipation factor (percent)

TABLE 2

| Run | Cat.[1] | Al Ratio | MI | Density (g/cc) | Mw (×10³) | Mw/Mn | Solvent Flow (kg/h) | $C_2H_4$ Flow (kg/h) | $C_8H_{16}$ Flow (kg/h) | $H_2$[2] Flow (sccm) | $C_2H_4$[3] Conv. (%) | Temp (° C.) | Eff.[4] |
|---|---|---|---|---|---|---|---|---|---|---|---|---|---|
| 9 | A2 | 97.8 | 0.96 | 0.919 | 730 | 2.26 | 12.3 | 1.8 | 0.4 | 93.5 | 92.1 | 190 | 3.1 |
| 10 | A7 | 50.2 | 0.98 | 0.910 | 67 | 2.32 | 12.6 | 1.7 | 0.6 | 53.0 | 91.7 | 190 | 2.2 |
| 11 | A7 | 50.4 | 1.00 | 0.909 | 70 | 2.02 | 12.6 | 1.7 | 0.6 | 62.2 | 90.5 | 160 | 4.0 |
| 12 | A8 | 50.4 | 0.86 | 0.910 | 94 | 2.24 | 12.6 | 1.7 | 0.6 | 34.6 | 89.7 | 190 | 0.6 |
| 13 | A8 | 50.3 | 1.59 | 0.911 | 73 | 2.08 | 12.6 | 1.7 | 0.6 | 74.3 | 90.3 | 160 | 1.0 |
| 14 | A9 | 50.4 | 0.87 | 0.911 | 67 | 2.39 | 12.6 | 1.7 | 0.6 | 24.9 | 92.5 | 190 | 1.8 |
| 15 | A9 | 49.2 | 1.06 | 0.910 | 66 | 2.32 | 12.6 | 1.7 | 0.6 | 46.7 | 89.9 | 160 | 5.5 |

[1] catalyst is co-fed with MMAO
[2] standard cm³/min
[3] percent ethylene conversion in reactor
[4] efficiency, g PE/μg Zr

The invention claimed is:

1. A process for polymerization of ethylene and one or more $C_{3-30}$ α-olefins or diolefins under continuous, solution polymerization conditions to prepare a polymer, said process comprising conducting the polymerization in the presence of a catalyst composition comprising a zirconium complex of a polyvalent aryloxyether corresponding to the formula:

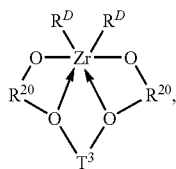

where:
$R^{20}$ independently each occurrence is a divalent aromatic or inertly substituted aromatic group containing from 5 to 20 atoms not counting hydrogen;
$T^3$ is a divalent hydrocarbon or silane group having from 1 to 20 atoms not counting hydrogen, or an inertly substituted derivative thereof; and
$R^D$ independently each occurrence is a monovalent ligand group of from 1 to 20 atoms, not counting hydrogen, or two $R^D$ groups together are a divalent ligand group of from 1 to 40 atoms, not counting hydrogen;
and an alumoxane activating cocatalyst in a molar quantity based on zirconium from 20:1 to 200:1
wherein the process is conducted at a temperature from 150 to 250° C. in the presence of a chain transfer agent to prepare a polymer having a density between 0.885 and 0.950 g/cm³, a melt index, $I_2$, <5.0, a molecular weight distribution Mw/Mn<3.0, and a catalyst efficiency of greater than 0.5 $g_{polymer}/\mu g_{metal}$.

2. The process of claim 1 wherein the quantity of chain transfer agent present in the reactor is sufficient to decrease the Mw of the resulting polymer at least 30 percent compared to the molecular weight of the resulting polymer prepared in the absence of a chain transfer agent.

3. The process of claim 1 wherein the chain transfer agent is hydrogen, present in an amount from 0.015 to 2.0 mol percent (based on ethylene).

4. The process of claim 1 wherein the ethylene conversion is at least 85 mol percent.

5. The process of claim 1 or claims 2-4 wherein a monomer mixture consisting essentially of ethylene and one or more $C_{3-20}$ α-olefins is polymerized.

6. The process of claim 5 wherein a monomer mixture consisting essentially of ethylene and one or more $C_{6-20}$ α-olefins is polymerized.

7. The process of claim 1 conducted at a temperature from 180 to 250° C. in the presence of a chain transfer agent to prepare a polymer having a density between 0.885 and 0.950 g/cm³, a melt index, $I_2$, <5.0, a molecular weight distribution Mw/Mn<3.0, and a catalyst efficiency of greater than 0.5 $g_{polymer}/\mu g_{metal}$.

8. The process of claim 1 to prepare a polymer having a dissipation factor at 130° C. of less than 1 percent.

9. The process of claim 8 wherein the alumoxane is present in an amount to provide a molar ratio based on Zr from 20:1 to 150:1.

10. The process of claim 9 wherein the alumoxane is present in an amount to provide a molar ratio based on Zr from 20:1 to 80:1.

11. The process of any one of claims 8-10 wherein the alumoxane is tri(isobutyl)aluminum modified methalumoxane or tri(n-octyl)aluminum modified methalumoxane.

12. The process of claim 11 wherein the tri(isobutyl)aluminum modified methalumoxane contains from 10 to 30 mole percent i-butyl content and the tri(n-octyl)aluminum modified methalumoxane contains from 10 to 20 mole percent n-octyl content, said molar percents being based on total alkyl ligand content in the alumoxane.

13. The process of claim 12 wherein the tri(isobutyl)aluminum modified methalumoxane contains from 15 to 25 mole percent i-butyl content and the tri(n-octyl)aluminum modified methalumoxane contains from 12 to 18 mole percent n-octyl content, said molar percents being based on total alkyl ligand content in the alumoxane.

14. The process of claim 1 or claims 2-4 conducted in a single reactor and the catalyst composition additionally comprises at least one other metal complex or compound.

15. The process of claim 1 or claims 2-4 conducted in at least one reactor of two or more reactors connected in series or in parallel.

16. The process of claim 15 wherein the catalyst composition employed in at least one reactor comprises at least one other metal complex.

17. A process according to claim 1 or claims 2-4 wherein the metal complex corresponds to the formula:

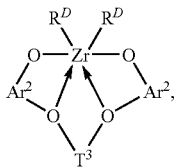

wherein:
Ar² independently each occurrence is an arylene or an alkyl-, aryl-, alkoxy-or amino-substituted arylene group of from 6 to 20 atoms not counting hydrogen or any atoms of any substituent;
T³ is a divalent hydrocarbon bridging group of from 2 to 20 atoms not counting hydrogen; and
$R^D$ independently each occurrence is a monovalent ligand group of from 1 to 20 atoms, not counting hydrogen, or two $R^D$ groups together are a divalent ligand group of from 1 to 40 atoms, not counting hydrogen.

18. The process of claim 17 wherein T³ is a divalent substituted or unsubstituted $C_{3-6}$ aliphatic, cycloaliphatic, or bis(alkylene)-substituted cycloaliphatic group.

19. A process for polymerization of ethylene and one or more $C_3$-30 α-olefins or diolefins under continuous, solution polymerization conditions to prepare a polymer, said process comprising conducting the polymerization in the presence of a catalyst composition comprising a zirconium complex of a polyvalent aryloxyether corresponding to the formula:

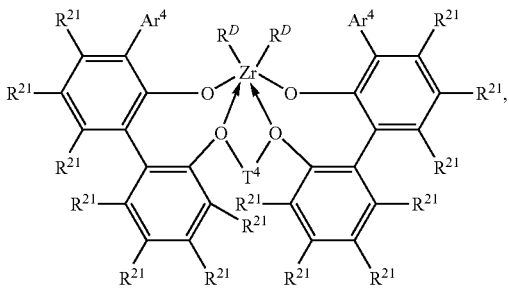

where
Ar⁴ independently each occurrence is $C_{6-20}$ aryl or inertly substituted derivatives thereof
T⁴ independently each occurrence is a propylene-1,3-diyl group, a cyclohexan-1,2-diyl group, a bis(alkylene)cyclohexan-1,2-diyl group, a cyclohexen-4,5-diyl group, or an inertly substituted derivative thereof;
$R^{21}$ independently each occurrence is hydrogen, halo, hydrocarbyl, trihydrocarbylsilyl, trihydrocarbylsilylhydrocarbyl, alkoxy or amino of up to 50 atoms not counting hydrogen; and
$R^D$, independently each occurrence is halo or a hydrocarbyl or trihydrocarbylsilyl group of up to 20 atoms not counting hydrogen, or 2 $R^D$ groups together are a divalent hydrocarbylene, hydrocarbadiyl or trihydrocarbylsilyl group of up to 40 atoms not counting hydrogen;

wherein the process is conducted at a temperature from 150 to 250° C. in the presence of a chain transfer agent to prepare a polymer having a density between 0.885 and 0.950 g/cm³, a melt index, $I_2$, <5.0, a molecular weight distribution Mw/Mn<3.0, and a catalyst efficiency of greater than 0.5 $g_{polymer}/\mu g_{metal}$.

20. The process of claim 19 wherein the metal complex corresponds to the formula:

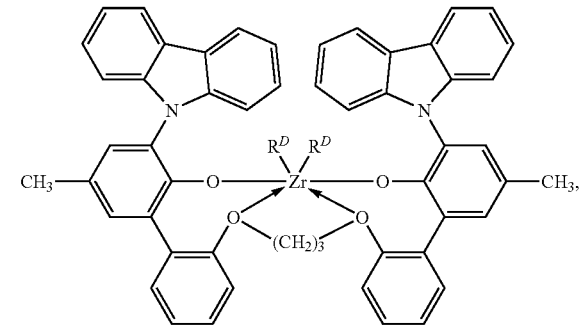

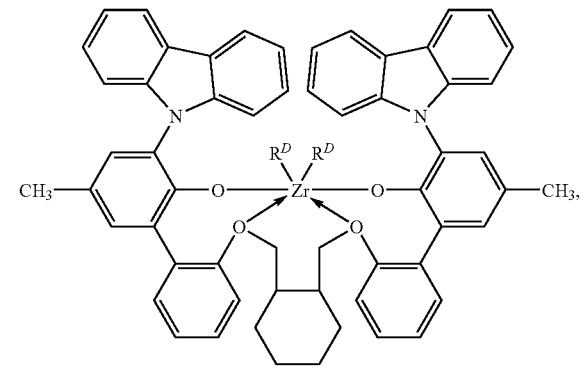

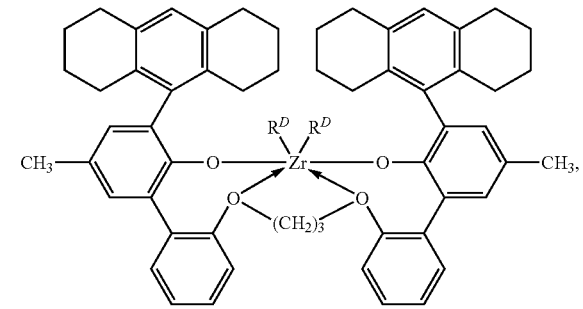

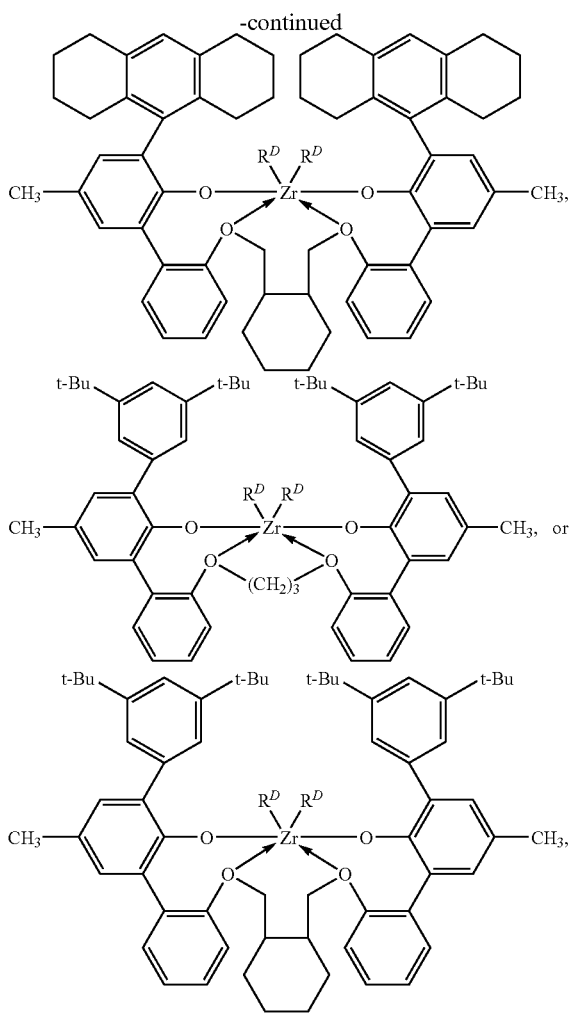

wherein, $R^D$ independently each occurrence is chloro, methyl or benzyl.

21. The process of claim 20 wherein the metal complex is selected from the group consisting of:

A) bis((2-oxoyl-3-(1,2,3,4,6,7,8,9-octahydroanthracen-5-yl)-5-(methyl)phenyl)-2-phenoxy)-1,3-propanediylzirconium (IV) dimethyl, bis((2-oxoyl-3-(1,2,3,4,6,7,8,9-octahydroanthracen-5-yl)-5-(methyl)phenyl)-2-phenoxy)-1,3-propanediylzirconium (IV) dichloride, bis((2-oxoyl-3-(1,2,3,4,6,7,8,9-octahydroanthracen-5-yl)-5-(methyl)phenyl)-2-phenoxy)-1,3-propanediylzirconium (IV) dibenzyl, bis((2-oxoyl-3-(dibenzo-1H-pyrrole-1-yl)-5-(methyl)phenyl)-2-phenoxy)-1,3-propanediylzirconium (IV) dimethyl, bis((2-oxoyl-3-(dibenzo-1H-pyrrole-1-yl)-5-(methyl)phenyl)-2-phenoxy)-1,3-propanediylzirconium (IV) dichloride, bis((2-oxoyl-3-(dibenzo-1H-pyrrole-1-yl)-5-(methyl)phenyl)-2-phenoxy)-1,3-propanediylzirconium (IV) dibenzyl, bis((2-oxoyl-3-(3,5-di-(1,1-dimethylethyl)phenyl)-5-(methyl)phenyl)-2-phenoxy)-1,3-propanediylzirconium (IV) dimethyl, bis((2-oxoyl-3-(3,5-di-(1,1-dimethylethyl)phenyl)-5-(methyl)phenyl)-2-phenoxy)-1,3-propanediylzirconium (IV) dichloride, bis((2-oxoyl-3-(3,5-di-(1,1-dimethylethyl)phenyl)-5-(methyl)phenyl)-2-phenoxy)-1,3-propanediylzirconium (IV) dibenzyl, bis((2-oxoyl-3-(1,2,3,4,6,7,8,9-octahydroanthracen-5-yl)-5-(methyl)phenyl)-2-phenoxymethyl)-trans-1,2-cyclohexanediylzirconium (IV) dimethyl, bis((2-oxoyl-3-(1,2,3,4,6,7,8,9-octahydroanthracen-5-yl)-5-(methyl)phenyl)-2-phenoxymethyl)-trans-1,2-cyclohexanediylzirconium (IV) dichloride, bis((2-oxoyl-3-(1,2,3,4,6,7,8,9-octahydroanthracen-5-yl)-5-(methyl)phenyl)-2-phenoxymethyl)-trans-1,2-cyclohexanediylzirconium (IV) dibenzyl, bis((2-oxoyl-3-(dibenzo-1H-pyrrole-1-yl)-5-(methyl)phenyl)-2-phenoxymethyl)-trans-1,2-cyclohexanediylzirconium (IV) dimethyl, bis((2-oxoyl-3-(dibenzo-1H-pyrrole-1-yl)-5-(methyl)phenyl)-2-phenoxymethyl)-trans-1,2-cyclohexanediylzirconium (IV) dichloride, bis((2-oxoyl-3-(dibenzo-1H-pyrrole-1-yl)-5-(methyl)phenyl)-2-phenoxymethyl)-trans-1,2-cyclohexanediylzirconium (IV) dibenzyl, bis((2-oxoyl-3-(3,5-di-(1,1-dimethylethyl)phenyl)-5-(methyl)phenyl)-2-phenoxymethyl)-trans-1,2-cyclohexanediylzirconium (IV) dimethyl, bis((2-oxoyl-3-(3,5-di-(1,1-dimethylethyl)phenyl)-5-(methyl)phenyl)-2-phenoxymethyl)-trans-1,2-cyclohexanediylzirconium (IV) dichloride, bis((2-oxoyl-3-(3,5-di-(1,1-dimethylethyl)phenyl)-5-(methyl)phenyl)-2-phenoxymethyl)-trans-1,2-cyclohexanediylzirconium (IV) dibenzyl, bis((2-oxoyl-3-(1,2,3,4,6,7,8,9-octahydroanthracen-5-yl)-5-(methyl)phenyl)-2-phenoxy)-cis-1,3-cyclohexanediylzirconium (IV) dimethyl, bis((2-oxoyl-3-(1,2,3,4,6,7,8,9-octahydroanthracen-5-yl)-5-(methyl)phenyl)-2-phenoxy)-cis-1,3-cyclohexanediylzirconium (IV) dichloride, bis((2-oxoyl-3-(1,2,3,4,6,7,8,9-octahydroanthracen-5-yl)-5-(methyl)phenyl)-2-phenoxy)-cis-1,3-cyclohexanediylzirconium (IV) dibenzyl, bis((2-oxoyl-3-(dibenzo-1H-pyrrole-1-yl)-5-(methyl)phenyl)-2-phenoxy)-cis-1,3-cyclohexanediylzirconium (IV) dimethyl, bis((2-oxoyl-3-(dibenzo-1H-pyrrole-1-yl)-5-(methyl)phenyl)-2-phenoxy)-cis-1,3-cyclohexanediylzirconium (IV) dichloride, bis((2-oxoyl-3-(dibenzo-1H-pyrrole-1-yl)-5-(methyl)phenyl)-2-phenoxy)-cis-1,3-cyclohexanediylzirconium (IV) dibenzyl bis((2-oxoyl-3v-5-(methyl)phenyl)-2-phenoxy)-cis-1,3-cyclohexanediylzirconium (IV) dimethyl, bis((2-oxoyl-3-(3,5-di-(1,1-dimethylethyl)phenyl)-5-(methyl)phenyl)-2-phenoxy)-cis-1,3-cyclohexanediylzirconium (IV) dichloride, bis((2-oxoyl-3-(3,5-di-(1,1-dimethylethyl)phenyl)-5-(methyl)phenyl)-2-phenoxy)-cis-1,3-cyclohexanediylzirconium (IV) dibenzyl, bis((2-oxoyl-3-(1,2,3,4,6,7,8,9-octahydroanthracen-5-yl)-5-(methyl)phenyl)-2-phenoxy)-cis-4,5-cyclohexenediylzirconium (IV) dimethyl, bis((2-oxoyl-3-(1,2,3,4,6,7,8,9-octahydroanthracen-5-yl)-5-(methyl)phenyl)-2-phenoxy)-cis-4,5-cyclohexenediylzirconium (IV) dichloride, bis((2-oxoyl-3-(1,2,3,4,6,7,8,9-octahydroanthracen-5-yl)-5-(methyl)phenyl)-2-phenoxy)-cis-4,5-cyclohexenediylzirconium (IV) dibenzyl, bis((2-oxoyl-3-(dibenzo-1H-pyrrole-1-yl)-5-(methyl)phenyl)-2-phenoxy)-cis-4,5-cyclohexenediylzirconium (IV) dimethyl, bis((2-oxoyl-3-(dibenzo-1H-pyrrole-1-yl)-5-(methyl)phenyl)-2-phenoxy)-cis-4,5-cyclohexenediylzirconium (IV) dichloride, bis((2-oxoyl-3-(dibenzo-1H-pyrrole-1-yl)-5-(methyl)phenyl)-2-phenoxy)-cis-4,5-cyclohexenediylzirconium (IV) dibenzyl bis((2-oxoyl-3-(3,5-di-(1,1-dimethylethyl)phenyl)-5-(methyl)phenyl)-2-phenoxy)-cis-4,5-cyclohexenediylzirconium (IV) dimethyl, bis((2-oxoyl-3-(3,5-di-(1,1-dimethylethyl)phenyl)-5-(methyl)phenyl)-2-phenoxy)-cis-4,5-cyclohexenediylzirconium (IV)

dichloride, bis((2-oxoyl-3-(3,5-di-(1,1,-dimethylethyl)phenyl)-5-(methyl)phenyl)-2-phenoxy)-cis-4,5-cyclohexenediylzirconium (IV) dibenzyl, B) bis((2-oxoyl-3-(1,2,3,4,6,7,8,9-octahydroanthracen-5-yl)-5-(methyl)phenyl)-(4-methyl-2-phenoxy)-1,3-propanediylzirconium (IV) dimethyl, bis((2-oxoyl-3-(1,2,3,4,6,7,8,9-octahydroanthracen-5-yl)-5-(methyl)phenyl)-(4-methyl-2-phenoxy)-1,3-propanediylzirconium (IV) dichloride, bis((2-oxoyl-3-(1,2,3,4,6,7,8,9-octahydroanthracen-5-yl)-5-(methyl)phenyl)-(4-methyl-2-phenoxy)-1,3-propanediylzirconium (IV) dibenzyl, bis((2-oxoyl-3-(dibenzo-1H-pyrrole-1-yl)-5-(methyl)phenyl)-(4-methyl-2-phenoxy)-1,3-propanediylzirconium (IV) dimethyl, bis((2-oxoyl-3-(dibenzo-1H-pyrrole-1-yl)-5-(methyl)phenyl)-(4-methyl-2-phenoxy)-1,3-propanediylzirconium (IV) dichloride, bis((2-oxoyl-3-(dibenzo-1H-pyrrole-1-yl)-5-(methyl)phenyl)-(4-methyl-2-phenoxy)-1,3-propanediylzirconium (IV) dibenzyl bis((2-oxoyl-3-(3,5-di-(1,1-dimethylethyl)phenyl)-5-(methyl)phenyl)-(4-methyl-2-phenoxy)-1,3-propanediylzirconium (IV) dimethyl, bis((2-oxoyl-3-(3,5-di-(1,1-dimethylethyl)phenyl)-5-(methyl)phenyl)-(4-methyl-2-phenoxy)-1,3-propanediylzirconium (IV) dichloride, bis((2-oxoyl-3-(3,5-di-(1,1-dimethylethyl)phenyl)-5-(methyl)phenyl)-(4-methyl-2-phenoxy)-1,3-propanediylzirconium (IV) dibenzyl, bis((2-oxoyl-3-(1,2,3,4,6,7,8,9-octahydroanthracen-5-yl)-5-(methyl)phenyl)-(4-methyl-2-phenoxymethyl)-trans-1,2-cyclohexanediylzirconium (IV) dimethyl, bis((2-oxoyl-3-(1,2,3,4,6,7,8,9-octahydroanthracen-5-yl)-5-(methyl)phenyl)-(4-methyl-2-phenoxymethyl)-trans-1,2-cyclohexanediylzirconium (IV) dichloride, bis((2-oxoyl-3-(1,2,3,4,6,7,8,9-octahydroanthracen-5-yl)-5-(methyl)phenyl)-(4-methyl-2-phenoxymethyl)-trans-1,2-cyclohexanediylzirconium (IV) dibenzyl, bis((2-oxoyl-3-(dibenzo-1H-pyrrole-1-yl)-5-(methyl)phenyl)-(4-methyl-2-phenoxymethyl)-trans-1,2-cyclohexanediylzirconium (IV) dimethyl, bis((2-oxoyl-3-(dibenzo-1H-pyrrole-1-yl)-5-(methyl)phenyl)-(4-methyl-2-phenoxymethyl)-trans-1,2-cyclohexanediylzirconium (IV) dichloride, bis((2-oxoyl-3-(dibenzo-1H-pyrrole-1-yl)-5-(methyl)phenyl)-(4-methyl-2-phenoxymethyl)-trans-1,2-cyclohexanediylzirconium (IV) dibenzyl, bis((2-oxoyl-3-(3,5-di-(1,1-dimethylethyl)phenyl)-5-(methyl)phenyl)-(4-methyl-2-phenoxymethyl)-trans-1,2-cyclohexanediylzirconium (IV) dimethyl, bis((2-oxoyl-3-(3,5-di-(1,1-dimethylethyl)phenyl)-5-(methyl)phenyl)-(4-methyl-2-phenoxymethyl)-trans-1,2-cyclohexanediylzirconium (IV) dichloride, bis((2-oxoyl-3-(3,5-di-(1,1-dimethylethyl)phenyl)-5-(methyl)phenyl)-(4-methyl-2-phenoxymethyl)-trans-1,2-cyclohexanediylzirconium (IV) dibenzyl, bis((2-oxoyl-3-(1,2,3,4,6,7,8,9-octahydroanthracen-5-yl)-5-(methyl)phenyl)-(4-methyl-2-phenoxy))-cis-1,3-cyclohexanediylzirconium (IV) dimethyl, bis((2-oxoyl-3-(1,2,3,4,6,7,8,9-octahydroanthracen-5-yl)-5-(methyl)phenyl)-(4-methyl-2-phenoxy))-cis-1,3-cyclohexanediylzirconium (IV) dichloride, bis((2-oxoyl-3-(1,2,3,4,6,7,8,9-octahydroanthracen-5-yl)-5-(methyl)phenyl)-(4-methyl-2-phenoxy))-cis-1,3-cyclohexanediylzirconium (IV) dibenzyl, bis((2-oxoyl-3-(dibenzo-1H-pyrrole-1-yl)-5-(methyl)phenyl)-(4-methyl-2-phenoxy))-cis-1,3-cyclohexanediylzirconium (IV) dimethyl, bis((2-oxoyl-3-(dibenzo-1H-pyrrole-1-yl)-5-(methyl)phenyl)-(4-methyl-2-phenoxy))-cis-1,3-cyclohexanediylzirconium (IV) dichloride, bis((2-oxoyl-3-(dibenzo-1H-pyrrole-1-yl)-5-(methyl)phenyl)-(4-methyl-2-phenoxy))-cis-1,3-cyclohexanediylzirconium (IV) dibenzyl, bis((2-oxoyl-3-(3,5-di-(1,1-dimethylethyl)phenyl)-5-(methyl)phenyl)-(4-methyl-2-phenoxy))-cis-1,3-cyclohexanediylzirconium (IV) dimethyl, bis((2-oxoyl-3-(3,5-di-(1,1-dimethylethyl)phenyl)-5-(methyl)phenyl)-(4-methyl-2-phenoxy))-cis-1,3-cyclohexanediylzirconium (IV) dichloride, bis((2-oxoyl-3-(3,5-di-(1,1-dimethylethyl)phenyl)-5-(methyl)phenyl)-(4-methyl-2-phenoxy))-cis-1,3-cyclohexanediylzirconium (IV) dibenzyl, bis((2-oxoyl-3-(1,2,3,4,6,7,8,9-octahydroanthracen-5-yl)-5-(methyl)phenyl)-(4-methyl-2-phenoxy))-cis-4,5-cyclohexenediylzirconium (IV) dimethyl, bis((2-oxoyl-3-(1,2,3,4,6,7,8,9-octahydroanthracen-5-yl)-5-(methyl)phenyl)-(4-methyl-2-phenoxy))-cis-4,5-cyclohexenediylzirconium (IV) dichloride, bis((2-oxoyl-3-(1,2,3,4,6,7,8,9-octahydroanthracen-5-yl)-5-(methyl)phenyl)-(4-methyl-2-phenoxy))-cis-4,5-cyclohexenediylzirconium (IV) dibenzyl, bis((2-oxoyl-3-(dibenzo-1H-pyrrole-1-yl)-5-(methyl)phenyl)-(4-methyl-2-phenoxy))-cis-4,5-cyclohexenediylzirconium (IV) dimethyl, bis((2-oxoyl-3-(dibenzo-1H-pyrrole-1-yl)-5-(methyl)phenyl)-(4-methyl-2-phenoxy))-cis-4,5-cyclohexenediylzirconium (IV) dichloride, bis((2-oxoyl-3-(dibenzo-1H-pyrrole-1-yl)-5-(methyl)phenyl)-(4-methyl-2-phenoxy))-cis-4,5-cyclohexenediylzirconium (IV) dibenzyl, bis((2-oxoyl-3-(3,5-di-(1,1-dimethylethyl)phenyl)-5-(methyl)phenyl)-(4-methyl-2-phenoxy))-cis-4,5-cyclohexenediylzirconium (IV) dimethyl, bis((2-oxoyl-3-(3,5-di-(1,1-dimethylethyl)phenyl)-5-(methyl)phenyl)-(4-methyl-2-phenoxy))-cis-4,5-cyclohexenediylzirconium (IV) dichloride, bis((2-oxoyl-3-(3,5-di-(1,1-dimethylethyl)phenyl)-5-(methyl)phenyl)-(4-methyl-2-phenoxy))-cis-4,5-cyclohexenediylzirconium (IV) dibenzyl, C) bis ((2-oxoyl-3-(1,2,3,4,6,7,8,9-octahydroanthracen-5-yl)-5-(methyl)phenyl)-(4-t-butyl-2-phenoxy)-1,3-propanediylzirconium (IV) dimethyl, bis((2-oxoyl-3-(1,2,3,4,6,7,8,9-octahydroanthracen-5-yl)-5-(methyl)phenyl)-(4-t-butyl-2-phenoxy)-1,3-propanediylzirconium (IV) dichloride, bis((2-oxoyl-3-(1,2,3,4,6,7,8,9-octahydroanthracen-5-yl)-5-(methyl)phenyl)-(4-t-butyl-2-phenoxy)-1,3-propanediylzirconium (IV) dibenzyl, bis((2-oxoyl-3-(dibenzo-1H-pyrrole-1-yl)-5-(methyl)phenyl)-(4-t-butyl-2-phenoxy)-1,3-propanediylzirconium (IV) dimethyl, bis((2-oxoyl-3-(dibenzo-1H-pyrrole-1-yl)-5-(methyl)phenyl)-(4-t-butyl-2-phenoxy)-1,3-propanediylzirconium (IV) dichloride, bis((2-oxoyl-3-(dibenzo-1H-pyrrole-1-yl)-5-(methyl)phenyl)-(4-t-butyl-2-phenoxy)-1,3-propanediylzirconium (IV) dibenzyl, bis((2-oxoyl-3-(3,5-di-(1,1-dimethylethyl)phenyl)-5-(methyl)phenyl)-(4-t-butyl-2-phenoxy)-1,3-propanediylzirconium (IV) dimethyl, bis((2-oxoyl-3-(3,5-di-(1,1-dimethylethyl)phenyl)-5-(methyl)phenyl)-(4-t-butyl-2-phenoxy)-1,3-propanediylzirconium (IV) dichloride, bis((2-oxoyl-3-(3,5-di-(1,1-dimethylethyl)phenyl)-5-(methyl)phenyl)-(4-t-butyl-2-phenoxy)-1,3-propanediylzirconium (IV) dibenzyl, bis((2-oxoyl-3-(1,2,3,4,6,7,8,9-octahydroanthracen-5-yl)-5-(methyl)phenyl)-(4-t-butyl-2-phenoxymethyl)-trans-1,2-cyclohexanediylzirconium (IV) dimethyl, bis((2-oxoyl-3-(1,2,3,4,6,7,8,9-octahydroanthracen-5-yl)-

5-(methyl)phenyl)-(4-t-butyl-2-phenoxymethyl)-trans-1,2-cyclohexanediylzirconium (IV) dichloride, bis((2-oxoyl-3-(1,2,3,4,6,7,8,9-octahydroanthracen-5-yl)-5-(methyl)phenyl)-(4-t-butyl-2-phenoxymethyl)-trans-1,2-cyclohexanediylzirconium (IV) dibenzyl, bis((2-oxoyl-3-(dibenzo-1H-pyrrole-1-yl)-5-(methyl)phenyl)-(4-t-butyl-2-phenoxymethyl)-trans-1,2-cyclohexanediylzirconium (IV) dimethyl, bis((2-oxoyl-3-(dibenzo-1H-pyrrole-1-yl)-5-(methyl)phenyl)-(4-t-butyl-2-phenoxymethyl)-trans-1,2-cyclohexanediylzirconium (IV) dichloride, bis((2-oxoyl-3-(dibenzo-1H-pyrrole-1-yl)-5-(methyl)phenyl)-(4-t-butyl-2-phenoxymethyl)-trans-1,2-cyclohexanediylzirconium (IV) dibenzyl bis((2-oxoyl-3-(3,5-di-(1,1-dimethylethyl)phenyl)-5-(methyl)phenyl)-(4-t-butyl-2-phenoxymethyl)-trans-1,2-cyclohexanediylzirconium (IV) dimethyl, bis((2-oxoyl-3v-5-(methyl)phenyl)-(4-t-butyl-2-phenoxymethyl)-trans-1,2-cyclohexanediylzirconium (IV) dichloride, bis((2-oxoyl-3-(3,5-di-(1,1-dimethylethyl)phenyl)-5-(methyl)phenyl)-(4-t-butyl-2-phenoxymethyl)-trans-1,2-cyclohexanediylzirconium (IV) dibenzyl,
bis((2-oxoyl-3-(1,2,3,4,6,7,8,9-octahydroanthracen-5-yl)-5-(methyl)phenyl)-(f4-t-butyl-2-phenoxy))-cis-1,3-cyclohexanediylzirconium (IV) dimethyl, bis((2-oxoyl-3-(1,2,3,4,6,7,8,9-octahydroanthracen-5-yl)-5-(methyl)phenyl)-(4-t-butyl-2-phenoxy))-cis-1,3-cyclohexanediylzirconium (IV) dichloride, bis((2-oxoyl-3-(1,2,3,4,6,7,8,9-octahydroanthracen-5-yl)-5-(methyl)phenyl)-(4-t-butyl-2-phenoxy))-cis-1,3-cyclohexanediylzirconium (IV) dibenzyl bis((2-oxoyl-3-(dibenzo-1H-pyrrole-1-yl)-5-(methyl)phenyl)-(4-t-butyl-2-phenoxy))-cis-1,3-cyclohexanediylzirconium (IV) dimethyl, bis((2-oxoyl-3-(dibenzo-1H-pyrrole-1-yl)-5-(methyl)phenyl)-(4-t-butyl-2-phenoxy))-cis-1,3-cyclohexanediylzirconium (IV) dichloride, bis((2-oxoyl-3-(dibenzo-1H-pyrrole-1-yl)-5-(methyl)phenyl)-(4-t-butyl-2-phenoxy))-cis-1,3-cyclohexanediylzirconium (IV) dibenzyl, bis((2-oxoyl-3-(3,5-di-(1,1-dimethylethyl)phenyl)-5-(methyl)phenyl)-(4-t-butyl-2-phenoxy))-cis-1,3-cyclohexanediylzirconium (IV) dimethyl, bis((2-oxoyl-3-(3,5-di-(1,1-dimethylethyl)phenyl)-5-(methyl)phenyl)-(4-t-butyl-2-phenoxy))-cis-1,3-cyclohexanediylzirconium (IV) dichloride, bis((2-oxoyl-3-(3,5-di-(1,1-dimethylethyl)phenyl)-5-(methyl)phenyl)-(4-t-butyl-2-phenoxy))-cis-1,3-cyclohexanediylzirconium (IV) dibenzyl
bis((2-oxoyl-3-(1,2,3,4,6,7,8,9-octahydroanthracen-5-yl)-5-(methyl)phenyl)-(4-t-butyl-2-phenoxy))-cis-4,5-cyclohexenediylzirconium (IV) dimethyl, bis((2-oxoyl-3-(1,2,3,4,6,7,8,9-octahydroanthracen-5-yl)-5-(methyl)phenyl)-(4-t-butyl-2-phenoxy))-cis-4,5-cyclohexenediylzirconium (IV) dichloride, bis((2-oxoyl-3-(1,2,3,4,6,7,8,9-octahydroanthracen-5-yl)-5-(methyl)phenyl)-(4-t-butyl-2-phenoxy))-cis-4,5-cyclohexenediylzirconium (IV) dibenzyl, bis((2-oxoyl-3-(dibenzo-1H-pyrrole-1-yl)-5-(methyl)phenyl)-(4-t-butyl-2-phenoxy))-cis-4,5-cyclohexenediylzirconium (IV) dimethyl, bis((2-oxoyl-3-(dibenzo-1H-pyrrole-1-yl)-5-(methyl)phenyl)-(4-t-butyl-2-phenoxy))-cis-4,5-cyclohexenediylzirconium (IV) dichloride, bis((2-oxoyl-3-(dibenzo-1H-pyrrole-1-yl)-5-(methyl)phenyl)-(4-t-butyl-2-phenoxy))-cis-4,5-cyclohexenediylzirconium (IV) dibenzyl, bis((2-oxoyl-3-(3,5-di-(1,1-dimethylethyl)phenyl)-5-(methyl)phenyl)-(4-t-butyl-2-phenoxy))-cis-4,5-cyclohexenediylzirconium (IV) dimethyl, bis((2-oxoyl-3-(3,5-di-(1,1-dimethylethyl)phenyl)-5-(methyl)phenyl)-(4-t-butyl-2-phenoxy))-cis-4,5-cyclohexenediylzirconium (IV) dichloride, and bis((2-oxoyl-3-(3,5-di-(1,1-dimethylethyl)phenyl)-5-(methyl)phenyl)-(4-t-butyl-2-phenoxy))-cis-4,5-cyclohexenediylzirconium (IV) dibenzyl.

22. The process of claim 19 wherein $Ar^4$ is independently each occurrence 3,5-di(isopropyl)phenyl, 3,5-di(isobutyl)phenyl, dibenzo-1H-pyrrole-1-yl, naphthyl, anthracen-5-yl, or 1,2,3,4,6,7,8,9-octahydroanthracen-5-yl.

* * * * *

UNITED STATES PATENT AND TRADEMARK OFFICE
CERTIFICATE OF CORRECTION

PATENT NO. : 8,202,953 B2  Page 1 of 1
APPLICATION NO. : 12/300859
DATED : June 19, 2012
INVENTOR(S) : Wayde V. Konze, James C. Stevens and Daniel D. VanderLende It is certified that error appears in the above-identified patent and that said Letters Patent is hereby corrected as shown below:

In the Claims:

Column 39, Line 42, Claim 21: should read

-- The process of Claim 19 --

Signed and Sealed this
Eighteenth Day of September, 2012

David J. Kappos
*Director of the United States Patent and Trademark Office*